(12) United States Patent
Markatou et al.

(10) Patent No.: US 10,449,518 B2
(45) Date of Patent: Oct. 22, 2019

(54) ZONED DIESEL OXIDATION CATALYST

(71) Applicant: JOHNSON MATTHEY PUBLIC LIMITED COMPANY, London (GB)

(72) Inventors: Penelope Markatou, Wayne, PA (US); Yaritza M. Lopez-De Jesus, Wayne, PA (US); Wassim Klink, Wayne, PA (US); Kieran John Cole, Royston (GB); Colin Russell Newman, Royston (GB); Robert Hanley, Royston (GB); Yoshihito Hashimoto, Sakura (JP); Masahito Shibata, Sakura (JP)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/701,560

(22) Filed: Sep. 12, 2017

(65) Prior Publication Data

US 2018/0001306 A1 Jan. 4, 2018

Related U.S. Application Data

(63) Continuation of application No. 14/445,125, filed on Jul. 29, 2014, now Pat. No. 9,764,310.
(Continued)

(30) Foreign Application Priority Data

Sep. 6, 2013 (GB) .................................. 1315892.8
Sep. 12, 2013 (GB) .................................. 1316278.9

(51) Int. Cl.
*B01D 53/94* (2006.01)
*B01J 23/44* (2006.01)
(Continued)

(52) U.S. Cl.
CPC ............ *B01J 23/44* (2013.01); *B01D 53/944* (2013.01); *B01D 53/9472* (2013.01);
(Continued)

(58) Field of Classification Search
None
See application file for complete search history.

(56) References Cited

U.S. PATENT DOCUMENTS 7,998,424 B2 8/2011 Bergeal et al.
8,637,426 B2 1/2014 Hoke et al.
(Continued)

FOREIGN PATENT DOCUMENTS

WO 9209848 A1 6/1992
WO 2012156883 A1 11/2012

*Primary Examiner* — Jelitza M Perez

(57) ABSTRACT

An oxidation catalyst is described for treating an exhaust gas from a diesel engine, which oxidation catalyst comprises: a substrate; a first washcoat region disposed on the substrate, wherein the first washcoat region comprises a first platinum group metal (PGM) and a first support material; a second washcoat region adjacent to the first washcoat region, wherein the second washcoat region comprises a second platinum group metal (PGM) and a second support material; a third washcoat region disposed on the substrate, wherein the third washcoat region comprises a third platinum group metal (PGM) and a third support material; and wherein either: (i) the third washcoat region is adjacent to the second washcoat region; or (ii) the second washcoat region is disposed or supported on the third washcoat region. Also described are uses and methods involving the oxidation catalyst.

29 Claims, 6 Drawing Sheets

Related U.S. Application Data

(60) Provisional application No. 61/860,608, filed on Jul. 31, 2013.

(51) Int. Cl.
 *B01J 23/42* (2006.01)
 *F01N 3/18* (2006.01)

(52) U.S. Cl.
 CPC ............... *B01J 23/42* (2013.01); *F01N 3/18* (2013.01); *B01D 2255/102* (2013.01); *B01D 2255/1021* (2013.01); *B01D 2255/1023* (2013.01); *B01D 2255/9022* (2013.01); *B01D 2255/9035* (2013.01); *B01D 2258/012* (2013.01)

(56) References Cited

U.S. PATENT DOCUMENTS

| | | | |
|---|---|---|---|
| 8,968,690 B2 | 3/2015 | Nunan et al. | |
| 2001/0026838 A1* | 10/2001 | Dettling | B01J 23/63 427/230 |
| 2008/0081762 A1* | 4/2008 | Kitamura | B01D 53/945 502/326 |
| 2010/0257843 A1* | 10/2010 | Hoke | B01D 53/945 60/274 |
| 2012/0304624 A1 | 12/2012 | Qi et al. | |

* cited by examiner

ZONED DIESEL OXIDATION CATALYST

CROSS REFERENCE TO RELATED APPLICATIONS

This application is a continuation of application Ser. No. 14/445,125, which claims priority benefit to U.S. Provisional Patent Application No. 61/860,608 filed on Jul. 31, 2013, to Great Britain Patent Application No. 1315892.8 filed on Sep. 6, 2013 and to Great Britain Patent Application No. 1316278.9 filed on Sep. 12, 2013, all of which are incorporation herein by reference.

FIELD OF THE INVENTION

The invention relates to an oxidation catalyst for a diesel engine, its uses and to a method of its production. The invention also relates to methods involving the oxidation catalyst. The invention further provides an exhaust system comprising the oxidation catalyst, and to a vehicle comprising the oxidation catalyst or the exhaust system.

BACKGROUND TO THE INVENTION

Diesel engines (also referred to as compression ignition engines) produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM).

Oxidation catalysts comprising platinum group metals (PGMs) have been used to treat carbon monoxide (CO) and hydrocarbons (HCs), including the volatile organic fraction (VOF) of particulate matter (PM), in exhaust emissions produced by diesel engines. Such catalysts treat carbon monoxide (CO) by oxidising it to carbon dioxide ($CO_2$), and treat hydrocarbons (HCs) by oxidising them to water ($H_2O$) and carbon dioxide ($CO_2$). Some platinum group metals, particularly when supported on a refractory oxide, can also promote the oxidation of nitric oxide (NO) to nitrogen dioxide ($NO_2$).

As emissions standards for permissible emission of pollutants from diesel engines, particularly vehicular engines, become progressively tightened, there is a need to provide improved exhaust systems that are able to meet these standards and which are cost-effective. It is desirable to provide an oxidation catalyst that has excellent activity toward CO and HCs, and which is not readily poisoned by sulphur in diesel fuel. It is important that the oxidation catalyst works in conjunction with other emissions control devices, particularly as part of an exhaust system to maximise the overall reduction in pollutants produced by a diesel engine.

Platinum group metals (PGMs) are expensive metals. Catalyst manufacturers are under pressure to maximise the effectiveness of any PGMs that are included in an oxidation catalyst to minimise its material cost. The method of producing the oxidation catalyst is also important because there is a manufacturing cost associated with each step of applying a washcoat to a substrate and to the subsequent drying and calcination steps.

Our earlier WO 2007/077462 describes an exhaust system for a lean-burn internal combustion engine comprising a catalyst for oxidising carbon monoxide (CO) and hydrocarbons (HCs), where the catalyst comprises a first washcoat zone containing at least one PGM, which first washcoat zone being defined at an upstream end by an inlet end of a substrate monolith and at a downstream end by a point less than half way along a length of the substrate monolith measured from the inlet end; a second washcoat zone containing at least one PGM, which second washcoat zone comprising the point half way along the substrate monolith length measured from the inlet end; and a third washcoat zone containing at least one PGM, which third washcoat zone being defined at a downstream end by an outlet end of the substrate monolith and at an upstream end by a point at most three quarters of the way along the substrate monolith length from the inlet end, wherein both the PGM loading in the first washcoat zone and the PGM loading in the third washcoat zone is greater than the PGM loading in the second washcoat zone and wherein the first washcoat zone comprises a washcoat loading that is less than a washcoat loading of the third washcoat zone.

SUMMARY OF THE INVENTION

The inventors have devised an oxidation catalyst having an arrangement that can be manufactured in a cost-effective manner and which maximises the effectiveness of its component PGMs. The oxidation catalyst provides excellent CO and HC oxidation activity, and is tolerant to sulphur in diesel fuel and its oxides. The oxidation catalyst also shows good activity toward oxidising nitric oxide (NO) to nitrogen dioxide ($NO_2$).

The invention provides an oxidation catalyst for treating an exhaust gas from a diesel engine, which oxidation catalyst comprises:
  a substrate;
  a first washcoat region disposed or supported on the substrate, wherein the first washcoat region comprises a first platinum group metal (PGM) and a first support material;
  a second washcoat region adjacent to the first washcoat region, wherein the second washcoat region comprises a second platinum group metal (PGM) and a second support material;
  a third washcoat region disposed or supported on the substrate, wherein the third washcoat region comprises a third platinum group metal (PGM) and a third support material; and wherein either:
  (i) the third washcoat region is adjacent to the second washcoat region; or
  (ii) the second washcoat region is disposed or supported on the third washcoat region.

When the second and third washcoat regions are arranged as described in (i) or (ii), exhaust gas entering the oxidation catalyst will primarily come into contact with the second washcoat region before the third washcoat region. This arrangement in the oxidation catalyst of the invention can be used to provide good tolerance to poisoning by sulphur in diesel fuel and to optimise the oxidation of nitric oxide (NO) to nitrogen dioxide ($NO_2$). In particular, the oxidation activity of the catalyst toward HCs can be maintained, even after some sulphation has occurred.

The invention also provides an exhaust system for a diesel engine. The exhaust system comprises an oxidation catalyst of the invention and an emissions control device.

The oxidation of nitric oxide (NO) to nitrogen dioxide ($NO_2$) by the oxidation catalyst can be important for the overall removal of pollutants by an exhaust system. The ratio of $NO_2$ to NO in an exhaust gas can affect the active or passive regeneration of an emissions control device that comprises a filtering substrate (e.g. diesel particulate filter (DPF), catalysed soot filter (CSF), selective catalytic reduction filter (SCRF™)). $NO_2$ in an exhaust gas can assist in the oxidation of particulate matter (PM) collected by a filtering substrate of a downstream emissions control device. The oxidation catalyst of the invention is particularly suitable for use in the active regeneration of an emissions control device comprising a filtering substrate.

The amount of $NO_2$ in an exhaust gas can also affect the performance of an emissions control device that is downstream of the oxidation catalyst. Selective catalytic reduction (SCR) catalysts and selective catalytic reduction filter (SCRF™) catalysts for treating $NO_x$ (e.g. $NO_2+NO$) often require the ratio of $NO_2$ to NO in the inlet gas to be within a specific range for optimum catalytic performance. The optimal $NO_2$ proportion of $NO_x$ typically depends on the type of composition used in the SCR or SCRF™ catalyst. The oxidation catalyst of the invention can be used with an SCR or SCRF™ catalyst, particularly an SCR or SCRF™ catalyst comprising a copper exchanged zeolite.

The invention further relates to a vehicle. The vehicle comprises a diesel engine and either an oxidation catalyst of the invention or an exhaust system of the invention.

The invention further provides methods of producing an oxidation catalyst of the invention.

In a first method aspect of producing the oxidation catalyst, the method comprises:
(i) coating a substrate with a first washcoat of length $L_1$, wherein the substrate has an axial length L and $L_1$ is less than or equal to the axial length L (e.g. $L_1 \leq L$); then
(ii) coating the substrate with a second washcoat of length $L_2$, wherein $L_2$ is less than or equal to the axial length L (e.g. $L_2 \leq L$);
(iii) drying the first washcoat and the second washcoat onto the substrate;
(iv) impregnating at least one of the first washcoat and the second washcoat with a platinum group metal to a length $L_3$, wherein $L_3$ is less than the axial length L (e.g. $L_3 < L$); and
(v) calcining the substrate coated with the first washcoat, the second washcoat and the impregnated platinum group metal.

In a second method aspect of producing the oxidation catalyst, the method comprises:
(i) coating a substrate from a first end with a first washcoat of length $L_1$, wherein the substrate has an axial length L and $L_1$ is less than the axial length L (e.g. $L_1 < L$); then
(ii) coating the substrate from a second end with a second washcoat of length $L_2$, wherein $L_2$ is greater than the difference between L and $L_1$ (e.g. $L_2 > L - L_1$); and
(iii) calcining the substrate coated with the first washcoat and the second washcoat.

Another aspect of the invention relates to a method of treating an exhaust gas from a diesel engine. The method comprises contacting the exhaust gas with an oxidation catalyst of the invention. The method of treating an exhaust gas from a diesel engine is a method of treating (e.g. oxidising) carbon monoxide (CO) and hydrocarbons (HCs) in an exhaust gas from a diesel engine, such as by oxidising carbon monoxide (CO), hydrocarbons (HCs) and nitric oxide (NO). Typically, the treated exhaust gas is then passed onto an emissions control device (i.e. downstream emissions control device). This aspect of the invention also relates to the use of an oxidation catalyst of the invention to treat an exhaust gas from a diesel engine, optionally in combination with an emissions control device.

The invention also provides a method of modulating the content of nitrogen oxides ($NO_x$) in an exhaust gas from a diesel engine for an emissions control device, which method comprises: (a) controlling the $NO_x$ content of an exhaust gas by contacting the exhaust gas with an oxidation catalyst of the invention to produce a treated exhaust gas; and (b) passing the treated exhaust gas to an emissions control device. This aspect of the invention also relates to the use of an oxidation catalyst of the invention to modulate the content of nitrogen oxides ($NO_x$) in an exhaust gas from a diesel engine for an emissions control device (i.e. downstream emissions control device).

Another aspect of the invention relates to the use of an oxidation catalyst of the invention in the regeneration of an emissions control device having a filtering substrate. The oxidation catalyst may be used in the active or passive regeneration of the emissions control device.

BRIEF DESCRIPTION OF THE DRAWINGS

FIG. 1 shows an oxidation catalyst comprising a first washcoat region (1), a second washcoat region (2) adjacent to the first washcoat region (1), and a third washcoat region (3) adjacent to the second washcoat region (2), which are disposed on a substrate (5).

FIG. 1 also provides a schematic representation of the oxidation catalysts shown in FIGS. 3 and 4.

FIG. 2 shows an oxidation catalyst comprising a first washcoat region (1), a second washcoat region (2) and a third washcoat region (3). The first washcoat region is disposed directly onto a substrate (5). The second washcoat region is disposed on the third washcoat region. Both the second washcoat region and third washcoat region are adjacent to the first washcoat region.

FIGS. 3 and 4 show oxidation catalysts where a second washcoat region (2) is the region of overlap between two washcoat layers (6 and 7) that are disposed on a substrate (5). In FIG. 3, an end of the washcoat layer (6) that forms a first washcoat region (1) overlaps an end of a washcoat layer (7) that forms a third washcoat region (3).

In FIG. 4, an end of an end of the washcoat layer (6) that forms a first washcoat region (1) is overlapped by an end of a washcoat layer (7) that forms a third washcoat region (3).

DETAILED DESCRIPTION OF THE INVENTION

Typically, the oxidation catalyst comprises a total amount by mass of the platinum group metal (PGM) component of 2.0 to 8.0 g. The total amount of PGM component that is used depends on, amongst other things, the size of the substrate and the intended application of the oxidation catalyst.

Generally, the oxidation catalyst comprises a ratio of the total mass of platinum to the total mass of the palladium of 3:1 to 1:3 (e.g. 2:1 to 1:2), such as 1.5:1 to 1:1.5. It is preferred that the total mass of platinum is greater than the total mass of palladium. Preferably, the ratio of the total mass of platinum to the total mass of palladium is 3:1 to 1.1:1 (e.g. 2.5:1 to 7:6), such as 2:1 to 1.25:1.

The oxidation catalyst generally has a total loading of platinum group metal of from 20 to 200 g ft$^{-3}$, preferably 25 to 175 g ft$^{-3}$, and more preferably 30 to 160 g ft$^{-3}$.

Figure 1:
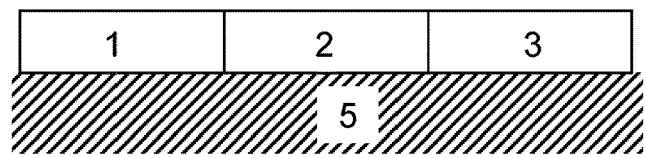
FIGS. 1 to 4 are representations of oxidation catalysts of the invention.
Figure 2:
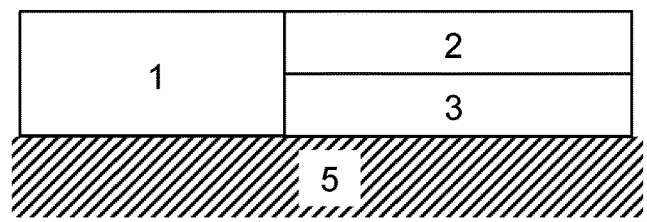

As shown schematically in the Figures, the oxidation catalyst of the invention comprises a substrate (5); a first washcoat region (1) disposed on the substrate (5); a second washcoat region (2) adjacent to the first washcoat region (1); and a third washcoat region (3) disposed on the substrate (5). The third washcoat region (3) may be adjacent to the second washcoat region (3) (see FIG. 1) or the second washcoat region (2) may be disposed on the third washcoat region (3) (see FIG. 2). The second washcoat region (2) is adjacent to the first washcoat region (1) on the substrate (e.g. the second washcoat region is disposed next to the first washcoat region along the length of the substrate).

For the avoidance of doubt, the first washcoat region (1), the second washcoat region (2) and the third washcoat region (3) are supported on the same substrate.

The oxidation catalyst may comprise an underlying washcoat layer disposed (e.g. directly disposed or supported) on the substrate. The first washcoat region and the third washcoat region may be directly disposed or supported on the underlying washcoat layer. When the oxidation catalyst has an arrangement where (i) the third washcoat region is adjacent to the second washcoat region, then the second washcoat region may be directly disposed or supported on the underlying washcoat layer.

The underlying washcoat layer typically has a length of at least 90% of the length of the substrate, such as 95 to 100% of the length of the substrate. It is preferred that the underlying washcoat layer has a length that is the same as the length of the substrate.

However, the first washcoat region is, in general, directly disposed (i.e. directly supported) on the substrate. This means that the first washcoat region is in contact with a surface of the substrate. It is preferred that there is no intermediary washcoat region (e.g. the underlying washcoat layer) between a surface of the substrate and the first washcoat region. More preferably, there is no intermediary washcoat region (e.g. the underlying washcoat layer) between a surface of the substrate and the first washcoat region and the third washcoat region (and also the second washcoat region when the oxidation catalyst has an arrangement where (i) the third washcoat region is adjacent to the second washcoat region).

The first washcoat region is typically upstream of the second washcoat region (i.e. the first washcoat region is nearer to an inlet end of the substrate than the second washcoat region is to the inlet end). The exhaust gas entering the oxidation catalyst will come into contact with the first washcoat region before it comes into contact with the second washcoat region. It is preferred that the first washcoat region is upstream of both the second washcoat region and the third washcoat region.

The first washcoat region of the oxidation catalyst of the invention is for initiating oxidation of hydrocarbons (HCs) and/or carbon monoxide (CO) in the exhaust gas, particularly hydrocarbons (HCs). Thus, the first washcoat region has a low HC light off temperature and/or CO light off temperature (e.g. a low HC $T_{50}$ and/or a low CO $T_{50}$). The activity of the first washcoat region is advantageous for relatively low exhaust gas temperatures, such as shortly after starting a diesel engine. The oxidation of HCs and/or CO by the first washcoat region generates an exotherm, which can increase the temperature of the exhaust gas and the body of the catalyst to a temperature that is optimal for catalysis by the second and third washcoat regions.

Generally, the first washcoat region comprises, or consists of, a first washcoat layer. The first washcoat layer may be directly disposed (i.e. directly supported) on the substrate.

The first washcoat region may comprise, or consist of, a first washcoat zone. The first washcoat zone may comprise, or consist of, a first washcoat layer. Thus, the first washcoat zone comprises, or consists of, the whole or complete length of the first washcoat layer.

The first washcoat zone may comprise, or consist of, a first washcoat layer and a fourth washcoat layer, wherein the fourth washcoat layer is disposed on the first washcoat layer. Thus, the first washcoat zone comprises, or consists of, the whole or complete length of the first washcoat layer and the whole or complete length of the fourth washcoat layer.

Figure 3:
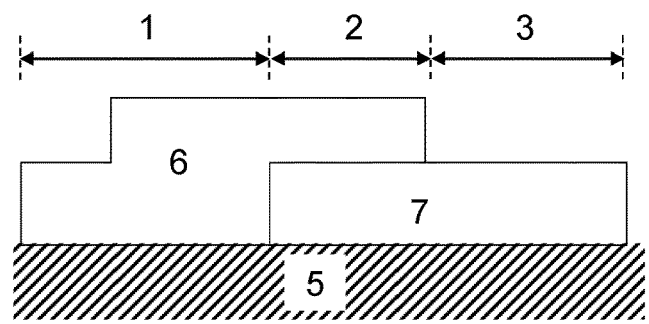
Figure 4:
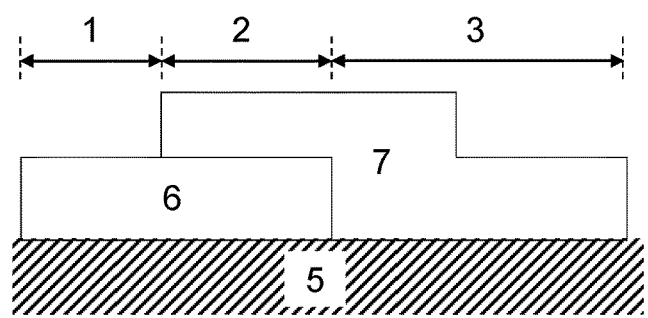

The first washcoat region may comprise, or consist of, a part or portion of the first washcoat layer (see (1) and (6) in FIGS. 3 and 4). The part of the first washcoat layer is a part length (e.g. not the whole or complete length) of the first washcoat layer.

When the first washcoat region comprises, or consists of, a part of the first washcoat layer, then typically there is an overlap between the first washcoat layer and a third washcoat layer (e.g. the third washcoat layer as defined below).

Additionally or alternatively, when the first washcoat region comprises, or consists of, a part of the first washcoat layer, then the first washcoat region or the part of the first washcoat layer may comprise a PGM zone. The part of the first washcoat layer (i.e. that forms the first washcoat region) may comprise, or consist of, a PGM zone and an adjacent part or portion of the first washcoat layer (i.e. the part or portion of the first washcoat layer is adjacent to the PGM zone on the substrate). The PGM zone can be prepared in accordance with the first method aspect of the invention. The PGM zone may be formulated to provide high oxidation activity toward hydrocarbons, such as higher activity than the remainder of the oxidation catalyst.

The length of the PGM zone is typically less than the length of the first washcoat region or the part of the first washcoat layer (i.e. that forms the first washcoat region). Thus, the first washcoat region or part of the first washcoat layer may be subdivided into a PGM zone and an adjacent part or portion of the first washcoat layer.

In general, the PGM zone is at or an adjacent to an inlet end of the substrate. The PGM is preferably upstream of the adjacent part or portion of the first washcoat layer.

The first washcoat region may comprise a first washcoat layer and a fourth washcoat layer, wherein the fourth washcoat layer is disposed on the first washcoat layer. When the first washcoat region comprises a first washcoat layer and a fourth washcoat layer, then preferably the first washcoat region comprises a part or portion of the first washcoat layer and a part or portion of the fourth washcoat layer, wherein the part of the fourth washcoat layer is disposed on the part of the first washcoat layer. The part of the first washcoat layer is a part length (e.g. not the whole or complete length) of the first washcoat layer. The part of the fourth washcoat layer is a part length (e.g. not the whole or complete length) of the fourth washcoat layer.

Generally, the first washcoat region or first washcoat zone has a length that is less than the length (i.e. axial length L) of the substrate. It is preferred that the first washcoat region or first washcoat zone has a length of at least 5% of the length of the substrate. The first washcoat region or first washcoat zone typically has a length of 10 to 80% of the length of the substrate, preferably 20 to 70%, more preferably 30 to 60% of the length of the substrate, such as 40 to 60% of the length of the substrate.

It is generally preferred that the first washcoat region or first washcoat zone is less than or equal to 50% of the length of the substrate, preferably less than 50% of the length of the substrate, more preferably less than 30% of the length of the substrate. Thus, the first washcoat region or first washcoat zone preferably has a length of 10 to 50% of the length of the substrate, more preferably 15 to 45% of the length of the substrate, such as 20 to 40% of the length of the substrate, and even more preferably 25 to 35% of the length of the substrate.

When the first washcoat region or the part of the first washcoat layer comprises a PGM zone, then the length of the PGM zone is typically 1 to 25% of the length of the substrate, preferably 2.5 to 20% of the length of the substrate (e.g. 2.5 to 7.5% of the length of the substrate, more preferably 5 to 15% of the length of the substrate (e.g. 5 to 10% of the length of the substrate).

The PGM zone may have a length of 0.5 to 2 inches (12.7 to 50.81 mm). It is preferred that the PGM zone has a length of 0.5 to 1.75 inches, such as 0.5 to 1.5 inches or 0.6 to 1.75 inches, more preferably 0.75 to 1.25 inches. Typically, the PGM zone has a length of about or approximately 1 inch (2.54 cm).

Generally, the first washcoat region or the first washcoat zone is disposed at or adjacent to an inlet end of the substrate.

The first washcoat region, the first washcoat zone or the first washcoat layer comprises a first platinum group metal (PGM). It is preferred that the only PGM in the first washcoat region is the first PGM.

The first PGM is typically selected from the group consisting of platinum, palladium and a combination of platinum and palladium. The first PGM may be platinum (e.g. platinum only). The first PGM may be palladium (e.g. palladium only). The first PGM may be a combination of platinum and palladium (e.g. platinum and palladium only).

In general, the total loading of the first PGM (e.g. of the first washcoat region, zone or layer) is greater than the total loading of the third PGM (e.g. of the third washcoat region, zone or layer).

The first washcoat region typically has a total loading of the first PGM of 5 to 300 g ft$^{-3}$. Preferably, the total loading of the first PGM is 10 to 250 g ft$^{-3}$, more preferably 15 to 200 g ft$^{-3}$ (e.g. 15 to 100 g ft$^{-3}$), still more preferably 20 to 150 g ft$^{-3}$ (e.g. 20 to 75 g ft$^{-3}$) and even more preferably 25 to 100 g ft$^{-3}$. When the first washcoat region comprises, or consists of, a first washcoat layer or a first washcoat zone, then preferably the first washcoat layer or first washcoat zone has a total loading of the first PGM of 5 to 300 g ft$^{-3}$. Preferably, the total loading of the first PGM is 10 to 250 g ft$^{-3}$, more preferably 15 to 200 g ft$^{-3}$ (e.g. 15 to 100 g ft$^{-3}$), still more preferably 20 to 150 g ft$^{-3}$ (e.g. 20 to 75 g ft$^{-3}$) and even more preferably 25 to 100 g ft$^{-3}$.

When the first PGM is a combination of platinum and palladium, then typically the first washcoat region, the first washcoat zone or the first washcoat layer comprises a ratio of the total mass of platinum to the total mass of palladium of 3.5:1 to 1:3.5 (e.g. 3:1 to 1:3), preferably 2:1 to 1:2, and more preferably 1.5:1 to 1:1.5 (e.g. about 1:1).

It is preferred that when the first PGM is a combination of platinum and palladium then the first washcoat region, the first washcoat zone or the first washcoat layer comprises a total mass of platinum that is greater than or equal to the total mass of palladium (e.g. the ratio of the total mass of platinum to the total mass of palladium is ≥1:1). Advantageous light off activity can be obtained when the total mass of platinum is greater than or equal to the total mass of palladium in the first washcoat region. More preferably, the ratio of the total mass of platinum to the total mass of palladium is 3.5:1 to 1:1 (e.g. 3.5:1 to 1.1:1), preferably 3:1 to 1.25:1, and more preferably 2.5:1 to 1.5:1.

When the first PGM is palladium or a combination of platinum and palladium, then the first washcoat region, the first washcoat zone or the first washcoat layer may comprise gold. The first washcoat region, the first washcoat zone or the first washcoat layer may comprise a palladium-gold alloy (e.g. the palladium of the first platinum group metal may be present as an alloy with gold). Catalysts comprising gold (Au) can be prepared using the method described in WO 2012/120292.

When the first washcoat region, the first washcoat zone or the first washcoat layer comprises gold, such as a palladium-gold alloy, then generally the first washcoat region, the first washcoat zone or the first washcoat layer comprises a ratio of the total mass of palladium (Pd) to the total mass of gold (Au) of 9:1 to 1:9, preferably 5:1 to 1:5, and more preferably 2:1 to 1:2.

The PGM zone typically comprises a platinum group metal (PGM) selected from the group consisting of platinum, palladium and a combination thereof. The definition of the first PGM comprises the platinum group metal (PGM) of the PGM zone.

The PGM zone comprises a different total amount (e.g. total loading) of PGM than the remainder of the first washcoat region (i.e. the adjacent part of the first washcoat layer). It is preferred that the PGM zone has a total amount (e.g. total loading) of PGM that is greater than the remainder of the first washcoat region.

It is preferred that the total loading of platinum (Pt) in the PGM zone is greater than the total loading of platinum (Pt) in the remainder of the first washcoat region (i.e. the adjacent part of the first washcoat layer). More preferably, the total loading of palladium (Pd) in the PGM zone is less than the total loading of palladium (Pd) in the remainder of the first washcoat region (i.e. the adjacent part of the first washcoat layer).

When the PGM zone comprises platinum (Pt) and palladium (Pd), then typically the weight ratio of platinum (Pt) to palladium (Pd) is ≥1:1. It is preferred that the weight ratio of platinum (Pt) to palladium (Pd) is ≥1.1:1, more preferably ≥1.25:1, particularly ≥1.5:1, such as ≥1.75:1 (e.g. ≥2:1), and still more preferably ≥2.5:1 (e.g. ≥5:1). Thus, the PGM zone typically comprises platinum (Pt) and palladium (Pd) in a weight ratio of 10:1 to 1:1 (e.g. 2:1 to 1.1:1 or 7.5:1 to 5:1), more preferably 8:1 to 1.25:1 (e.g. 7:1 to 1.5:1), and still more preferably 6:1 to 2.5:1.

Typically, the first support material comprises, or consists essentially of, a refractory metal oxide. Refractory metal oxides suitable for use as a support material in an oxidation catalyst for a diesel engine are well known in the art. The refractory metal oxide may be selected from the group consisting of alumina, silica, titania, zirconia, ceria and mixed or composite oxides of two or more thereof. It is preferred that the refractory metal oxide is selected from alumina, silica and mixed or composite oxides thereof. More preferably, the refractory metal oxide is selected from alumina and silica-alumina. Even more preferably, the refractory metal oxide is alumina.

When the first PGM is palladium or a combination of platinum and palladium, then the first support material may or may not comprise, or consist of, cerium oxide, particularly ceria ($CeO_2$) or ceria-zirconia ($CeO_2$—$ZrO_2$).

In general, the first PGM is disposed or supported on the first support material. When the first washcoat region, the first washcoat zone or the first washcoat layer comprises gold, then the gold or the palladium-gold alloy may be disposed or supported on the first support material. For example, the first PGM and/or gold can be dispersed on the first support material and/or impregnated into the first support material.

The first washcoat region, the first washcoat layer or the first washcoat zone typically comprises a total washcoat loading of 0.25 to 5 g $in^{-3}$, preferably 0.5 to 4 g $in^{-3}$, such as 0.75 to 3 g $in^{-3}$, more preferably 1.0 to 2.5 g $in^{-3}$, such as 1.25 to 2.0 g $in^{-3}$.

The first washcoat region, the first washcoat zone or the first washcoat layer may further comprise a hydrocarbon adsorbent. The hydrocarbon adsorbent may be selected from a zeolite, active charcoal, porous graphite and a combination of two or more thereof. It is preferred that the hydrocarbon adsorbent is a zeolite.

When the first washcoat region, the first washcoat zone or the first washcoat layer comprises a hydrocarbon adsorbent, then typically the total amount of hydrocarbon adsorbent is 0.05 to 3.00 g $in^{-3}$, particularly 0.10 to 2.00 g $in^{-3}$ (e.g. 0.2 to 0.8 g $in^{-3}$).

The first washcoat region, the first washcoat zone or the first washcoat layer may or may not comprise an alkaline earth metal.

Typically, the alkaline earth metal comprises magnesium (Mg), calcium (Ca), strontium (Sr), barium (Ba) or a combination of two or more thereof. It is preferred that the alkaline earth metal comprises calcium (Ca), strontium (Sr), or barium (Ba), more preferably strontium (Sr) or barium (Ba), and most preferably the alkaline earth metal comprises barium (Ba).

Typically, the amount of the alkaline earth metal is 0.07 to 3.75 mol $ft^{-3}$, particularly 0.1 to 3.0 mol $ft^{-3}$, more particularly 0.2 to 2.5 mol $ft^{-3}$ (e.g. 0.25 to 1.0 mol $ft^{-3}$), such as 0.3 to 2.25 mol $ft^{-3}$, especially 0. 0.35 to 1.85 mol $ft^{-3}$, preferably 0.4 to 1.5 mol $ft^{-3}$, more preferably 0.5 to 1.25 mol $ft^{-3}$.

When the first washcoat region, the first washcoat zone or the first washcoat layer further comprises an alkaline earth metal, then the first support material may or may not comprise, or consist essentially of, alumina doped with a heteroatom component. The heteroatom component typically comprises silicon, magnesium, barium, lanthanum, cerium, titanium, or zirconium or a combination of two or more thereof. The heteroatom component may comprises, or consist essentially of, an oxide of silicon, an oxide of magnesium, an oxide of barium, an oxide of lanthanum, an oxide of cerium, an oxide of titanium or an oxide of zirconium. More preferably, the alumina doped with a heteroatom component is alumina doped with silica or alumina doped with magnesium oxide. Even more preferably, the alumina doped with a heteroatom component is alumina doped with silica. Alumina doped with a heteroatom component can be prepared using methods known in the art or, for example, by a method described in U.S. Pat. No. 5,045,519.

The first washcoat region, the first washcoat zone or the first washcoat layer may consist essentially of a first PGM, a first support material and an alkaline earth metal component.

The first washcoat region, the first washcoat zone or the first washcoat layer preferably consists essentially of a first PGM and a first support material.

The second washcoat region is adjacent to the first washcoat region. The second washcoat region is either (i) adjacent (e.g. directly adjacent) to the third washcoat region or (ii) the second washcoat region is disposed on the third washcoat region.

Exhaust gas entering the catalyst of the invention generally comes into contact with the second washcoat region before the third washcoat region. The second washcoat region acts as a "stabilizer" for the first washcoat region. The second washcoat region acts as a "stabilizer" in the sense that it performs some or all of the oxidation reactions of the first washcoat region, but the second washcoat region may have a higher light off temperature for HC and/or CO than that of the first washcoat region. This is to ensure that the oxidation of HCs and/or CO is continued at higher exhaust gas temperatures and it may generate an additional exotherm.

The second washcoat region may also provide two other functions: (1) to oxidise NO to $NO_2$, particularly when the second PGM is platinum only, and/or (2) to protect the third washcoat region from being poisoned by sulphur in diesel fuel or the oxides thereof, particularly when the third PGM of the third washcoat region comprises palladium. Platinum is generally more resistant than palladium to poisoning by sulphur. Platinum also shows excellent NO oxidation activity. When, for example, the second PGM is platinum (i.e. only platinum), then it may protect the third washcoat region from sulphur poisoning that occurs at higher temperatures, thereby improving the sulphur tolerance of the oxidation catalyst as a whole.

Generally, the second washcoat region has a different composition (i.e. a different overall composition) to the first washcoat region.

Typically, the second washcoat region has a length that is less than the length (i.e. axial length L) of the substrate. It is preferred that the second washcoat region has a length of at least 10% of the length of the substrate, more preferably at least 15% of the length of the substrate, such as at least 20% of the length of the substrate.

The second washcoat region may have a length of 10 to 70% of the length of the substrate (e.g. 40 to 70%), such as 15 to 60% of the length of the substrate, particularly, 20 to 50% of the length of the substrate, preferably 30 to 40% of the length of the substrate.

The second washcoat region may comprise, or consist of, a second washcoat zone.

The second washcoat region may comprise, or consist of, a second washcoat layer.

The second washcoat region, the second washcoat zone or the second washcoat layer typically abuts or is contiguous with the first washcoat region.

The second washcoat region comprises a second platinum group metal (PGM). It is preferred that the only PGM in the second washcoat region is the second PGM.

Typically, the second PGM is selected from the group consisting of platinum, palladium and a combination of platinum and palladium. The second PGM may be platinum (e.g. platinum only). The second PGM may be palladium (e.g. palladium only). The second PGM may be a combination of platinum and palladium (e.g. platinum and palladium only).

The second washcoat region typically has a total loading of the second PGM of 5 to 300 g $ft^{-3}$. Preferably, the total loading of the second PGM is 10 to 250 g $ft^{-3}$, more preferably 15 to 200 g ft$^{-3}$ (e.g. 15 to 100 g ft$^{-3}$), still more preferably 20 to 150 g ft$^{-3}$ (e.g. 20 to 75 g ft$^{-3}$) and even more preferably 25 to 100 g ft$^{-3}$. When the second washcoat region comprises, or consists of, a second washcoat layer or a second washcoat zone, then preferably the second washcoat layer or the second washcoat zone has a total loading of the second PGM of 10 to 250 g ft$^{-3}$, more preferably 15 to 200 g ft$^{-3}$ (e.g. 15 to 100 g ft$^{-3}$), still more preferably 20 to 150 g ft$^{-3}$ (e.g. 20 to 75 g ft$^{-3}$), such as 25 to 100 g ft$^{-3}$.

Generally, when the second PGM is a combination of platinum and palladium, the second washcoat region, the second washcoat zone or the second washcoat layer comprises a ratio of the total mass of platinum to the total mass of palladium of 10:1 to 1:10 (e.g. 7.5:1 to 1:7.5), preferably 5:1 to 1:5 (e.g. 3:1 to 1:3), and more preferably 2.5:1 to 1:2.5 (e.g. 2:1 to 1:2).

When the second PGM is palladium or a combination of platinum and palladium, then the second washcoat region, the second washcoat zone or the second washcoat layer may comprise gold. The second washcoat region, the second washcoat zone or the second washcoat zone may comprise a palladium-gold alloy (e.g. the palladium of the second PGM may be an alloy with gold).

When the second washcoat region, the second washcoat zone or the second washcoat layer comprises gold, such as a palladium-gold alloy, then generally the second washcoat region, the second washcoat zone or the second washcoat layer comprises a ratio of the total mass of palladium (Pd) to the total mass of gold (Au) of 9:1 to 1:9, preferably 5:1 to 1:5, and more preferably 2:1 to 1:2.

Typically, the second support material comprises, or consists essentially of, a refractory metal oxide. The refractory metal oxide may be selected from the group consisting of alumina, silica, titania, zirconia, ceria and mixed or composite oxides of two or more thereof. It is preferred that the refractory metal oxide is selected from alumina, silica and mixed or composite oxides thereof. More preferably, the refractory metal oxide is selected from alumina and silica-alumina. Even more preferably, the refractory metal oxide is alumina.

In general, the second PGM is disposed or supported on the second support material. When the second washcoat region, the second washcoat zone or the second washcoat layer comprises gold, then the gold or the palladium-gold alloy may be disposed or supported on the second support material. For example, the second PGM and/or gold can be dispersed on the second support material and/or impregnated into the second support material.

When the second PGM is palladium or a combination of platinum and palladium, then the second support material may or may not comprise, or consist of, cerium oxide, particularly ceria (CeO$_2$) or ceria-zirconia (CeO$_2$—ZrO$_2$).

The second washcoat region, the second washcoat layer or the second washcoat zone typically comprises a total washcoat loading of 0.25 to 5 g in$^{-3}$, preferably 0.5 to 4 g in$^{-3}$, such as 0.75 to 3 g in$^{-3}$, more preferably 1.0 to 2.5 g in$^{-3}$, such as 1.25 to 2.0 g in$^{-3}$.

The second washcoat region, the second washcoat zone or the second washcoat layer may further comprise a hydrocarbon adsorbent. The hydrocarbon adsorbent may be selected from a zeolite, active charcoal, porous graphite and a combination of two or more thereof. It is preferred that the hydrocarbon adsorbent is a zeolite.

When the second washcoat region, the second washcoat zone or the second washcoat layer comprises a hydrocarbon adsorbent, then typically the total amount of hydrocarbon adsorbent is 0.05 to 3.00 g in$^{-3}$, particularly 0.10 to 2.00 g in$^{-3}$, more particularly 0.2 to 0.8 g in$^{-3}$.

The second washcoat region, the second washcoat zone or the second washcoat layer may or may not comprise an alkaline earth metal.

Typically, the alkaline earth metal comprises magnesium (Mg), calcium (Ca), strontium (Sr), barium (Ba) or a combination of two or more thereof. It is preferred that the alkaline earth metal comprises calcium (Ca), strontium (Sr), or barium (Ba), more preferably strontium (Sr) or barium (Ba), and most preferably the alkaline earth metal comprises barium (Ba).

Typically, the amount of the alkaline earth metal is 0.07 to 3.75 mol ft$^{-3}$, particularly 0.1 to 3.0 mol ft$^{-3}$, more particularly 0.2 to 2.5 mol ft$^{-3}$ (e.g. 0.25 to 1.0 mol ft$^{-3}$), such as 0.3 to 2.25 mol ft$^{-3}$, especially 0. 0.35 to 1.85 mol ft$^{-3}$, preferably 0.4 to 1.5 mol ft$^{-3}$, more preferably 0.5 to 1.25 mol ft$^{-3}$.

When the second washcoat region, the second washcoat zone or the second washcoat layer further comprises an alkaline earth metal, then the second support material may or may not comprise, or consist essentially of, alumina doped with a heteroatom component. The heteroatom component typically comprises silicon, magnesium, barium, lanthanum, cerium, titanium, or zirconium or a combination of two or more thereof. The heteroatom component may comprises, or consist essentially of, an oxide of silicon, an oxide of magnesium, an oxide of barium, an oxide of lanthanum, an oxide of cerium, an oxide of titanium or an oxide of zirconium. More preferably, the alumina doped with a heteroatom component is alumina doped with silica or alumina doped with magnesium oxide. Even more preferably, the alumina doped with a heteroatom component is alumina doped with silica.

The second washcoat region, the second washcoat zone or the second washcoat layer may consist essentially of a second PGM, a second support material and an alkaline earth metal component. The second washcoat region, the second washcoat zone or the second washcoat layer preferably consists essentially of a second PGM and a second support material.

In general, the third washcoat region is directly disposed (i.e. directly supported) on the substrate. This means that the third washcoat region is in contact with a surface of the substrate. It is preferred that there is no intermediary washcoat region between a surface of the substrate and the third washcoat region.

The third washcoat region is typically downstream of the first washcoat region (i.e. the third washcoat region is nearer to an outlet end of the substrate than the first washcoat region is to the inlet end). Exhaust gas entering the oxidation catalyst will come into contact with both the first washcoat region (and also the second washcoat region) before it comes into contact with the third washcoat region.

Exhaust gas entering the catalyst generally comes into contact with the third washcoat region after it has contacted the first and second washcoat regions. The first and second washcoat regions advantageously generate heat by oxidising HCs and CO, which can bring the temperature of the exhaust gas and the third washcoat region up to its light off temperature for NO oxidation.

Generally, the third washcoat region has a different composition (i.e. a different overall composition) to the second washcoat region. It is preferred that the third washcoat region has a different composition (i.e. a different overall composition) to both the first washcoat region and the second washcoat region.

The third washcoat region may comprise, or consist of, a third washcoat layer.

The third washcoat region may comprise, or consist of, a third washcoat zone. The third washcoat zone may comprise, or consist of, a third washcoat layer. Thus, the third washcoat zone comprises, or consists of, the whole or complete length of the third washcoat layer.

The third washcoat region may comprise, or consist of, a part or portion of the third washcoat layer (see (3) and (7) in FIGS. 3 and 4). The part of the third washcoat layer is a part length (e.g. not the whole or complete length) of the third washcoat layer. When the third washcoat region comprises, or consists of, a part or portion of the third washcoat layer, then typically there is an overlap between the first washcoat layer and the third washcoat layer.

The third washcoat region comprises a third platinum group metal (PGM). It is preferred that the only PGM in the third washcoat region is the third PGM.

Typically, the third PGM is selected from the group consisting of platinum, palladium and a combination of platinum and palladium. The third PGM may be platinum (e.g. platinum only). The third PGM may be palladium (e.g. palladium only). The third PGM may be a combination of platinum and palladium (e.g. platinum and palladium only).

The third washcoat region typically has a total loading of the third PGM of 5 to 300 g ft$^{-3}$. Preferably, the total loading of the third PGM is 7.5 to 250 g ft$^{-3}$, more preferably 10 to 200 g ft$^{-3}$ (e.g. 15 to 100 g ft$^{-3}$), still more preferably 15 to 150 g ft$^{-3}$ (e.g. 20 to 75 g ft$^{-3}$) and even more preferably 25 to 100 g ft$^{-3}$. When the third washcoat region comprises, or consists of, a third washcoat layer or a third washcoat zone, then preferably the third washcoat layer or third washcoat zone has a total loading of the third PGM of 10 to 250 g ft$^{-3}$, more preferably 15 to 200 g ft$^{-3}$ (e.g. 15 to 100 g ft$^{-3}$), still more preferably 20 to 150 g ft$^{-3}$ (e.g. 20 to 75 g ft$^{-3}$) and even more preferably 25 to 100 g ft$^{-3}$.

Generally, when the third PGM is a combination of platinum and palladium, the third washcoat region, the third washcoat zone or the third washcoat layer comprises a ratio of the total mass of platinum to the total mass of palladium of 10:1 to 1:10 (e.g. 7.5:1 to 1:7.5), preferably 5:1 to 1:5 (e.g. 3:1 to 1:3), and more preferably 2.5:1 to 1:2.5 (e.g. 2:1 to 1:2).

It is preferred that when the third PGM is a combination of platinum and palladium then the third washcoat region, the third washcoat zone or the third washcoat layer comprises a total mass of platinum that is greater than or equal to the total mass of palladium (e.g. the ratio of the total mass of platinum to the total mass of palladium is ≥1:1). More preferably, the ratio of the total mass of platinum to the total mass of palladium is 10:1 to 1:1 (e.g. 7.5:1 to 1.1:1), preferably 5:1 to 1.25:1, and more preferably 2.5:1 to 1.5:1.

When the third PGM is palladium or a combination of platinum and palladium, then the third washcoat region, the third washcoat zone or the third washcoat layer may comprise gold. The third washcoat region, the third washcoat zone or the third washcoat zone may comprise a palladium-gold alloy (e.g. the palladium of the second PGM may be an alloy with gold).

When the third washcoat region, the third washcoat zone or the third washcoat layer comprises gold, such as a palladium-gold alloy, then generally the third washcoat region, the third washcoat zone or the third washcoat layer comprises a ratio of the total mass of palladium (Pd) to the total mass of gold (Au) of 9:1 to 1:9, preferably 5:1 to 1:5, and more preferably 2:1 to 1:2.

Typically, the third support material comprises, or consists essentially of, a refractory metal oxide. The refractory metal oxide may be selected from the group consisting of alumina, silica, titania, zirconia, ceria and mixed or composite oxides of two or more thereof. It is preferred that the refractory metal oxide is selected from alumina, silica and mixed or composite oxides thereof. More preferably, the refractory metal oxide is selected from alumina and silica-alumina. Even more preferably, the refractory metal oxide is alumina.

When the third PGM is palladium or a combination of platinum and palladium, then the third support material may or may not comprise, or consist of, cerium oxide, particularly ceria ($CeO_2$) or ceria-zirconia ($CeO_2$—$ZrO_2$).

In general, the third PGM is disposed or supported on the third support material. When the third washcoat region, the third washcoat zone or the third washcoat layer comprises gold, then the gold or the palladium-gold alloy may be disposed or supported on the third support material. For example, the third PGM and/or gold can be dispersed on the third support material and/or impregnated into the third support material.

The third washcoat region, the third washcoat layer or the third washcoat zone typically comprises a total washcoat loading of 0.25 to 5 g in$^{-3}$, preferably 0.5 to 4 g in$^{-3}$, such as 0.75 to 3 g in$^{-3}$, more preferably 1.0 to 2.5 g in$^{-3}$, such as 1.25 to 2.0 g in$^{-3}$.

The third washcoat region, the third washcoat zone or the third washcoat layer may further comprise a hydrocarbon adsorbent. The hydrocarbon adsorbent may be selected from a zeolite, active charcoal, porous graphite and a combination of two or more thereof. It is preferred that the hydrocarbon adsorbent is a zeolite.

When the third washcoat region, the third washcoat zone or the third washcoat layer comprises a hydrocarbon adsorbent, then typically the total amount of hydrocarbon adsorbent is 0.05 to 3.00 g in$^{-3}$, particularly 0.10 to 2.00 g in$^{-3}$, more particularly 0.2 to 0.8 g in$^{-3}$.

The third washcoat region, the third washcoat zone or the third washcoat layer may or may not comprise an alkaline earth metal.

Typically, the alkaline earth metal comprises magnesium (Mg), calcium (Ca), strontium (Sr), barium (Ba) or a combination of two or more thereof. It is preferred that the alkaline earth metal comprises calcium (Ca), strontium (Sr), or barium (Ba), more preferably strontium (Sr) or barium (Ba), and most preferably the alkaline earth metal comprises barium (Ba).

Typically, the amount of the alkaline earth metal is 0.07 to 3.75 mol ft$^{-3}$, particularly 0.1 to 3.0 mol ft$^{-3}$, more particularly 0.2 to 2.5 mol ft$^{-3}$ (e.g. 0.25 to 1.0 mol ft$^{-3}$), such as 0.3 to 2.25 mol ft$^{-3}$, especially 0. 0.35 to 1.85 mol ft$^{-3}$, preferably 0.4 to 1.5 mol ft$^{-3}$, more preferably 0.5 to 1.25 mol ft$^{-3}$.

When the third washcoat region, the third washcoat zone or the third washcoat layer further comprises an alkaline earth metal, then the first support material may or may not comprise, or consist essentially of, alumina doped with a heteroatom component. The heteroatom component typically comprises silicon, magnesium, barium, lanthanum, cerium, titanium, or zirconium or a combination of two or more thereof. The heteroatom component may comprises, or consist essentially of, an oxide of silicon, an oxide of magnesium, an oxide of barium, an oxide of lanthanum, an oxide of cerium, an oxide of titanium or an oxide of zirconium. More preferably, the alumina doped with a heteroatom component is alumina doped with silica or alumina doped with magnesium oxide. Even more preferably, the alumina doped with a heteroatom component is alumina doped with silica.

The third washcoat region, the third washcoat zone or the third washcoat layer may consist essentially of a third PGM, a third support material and an alkaline earth metal component. The third washcoat region, the third washcoat zone or the third washcoat layer preferably consists essentially of a third PGM and a third support material.

A first aspect of the oxidation catalyst of the invention relates to an arrangement where (i) the third washcoat region is adjacent (e.g. directly adjacent) to the second washcoat region. The third washcoat region may abut or be contiguous with the second washcoat region. Typically, the third washcoat region is adjacent to the second washcoat region on the substrate (e.g. the third washcoat region is disposed next to the first second region along the length of the substrate).

In the first oxidation catalyst aspect, typically each of the second washcoat region and the third washcoat region is directly disposed (i.e. directly supported) on the substrate.

The second washcoat region, in the first oxidation catalyst aspect, may be disposed at or adjacent to an inlet end or an outlet end of the substrate.

The third washcoat region is typically disposed at or adjacent to an outlet end of the substrate.

Generally, in the first oxidation catalyst aspect, the total loading of the second PGM (e.g. in the second washcoat region or second washcoat zone) is greater than the total loading of the third PGM (e.g. in the third washcoat region or the third washcoat zone).

In the first oxidation catalyst aspect, the total loading of the second PGM (e.g. in the second washcoat region or the second washcoat zone) is typically greater than the total loading of the first PGM (e.g. in the first washcoat region or the first washcoat zone).

Typically, in the first oxidation catalyst aspect, the first washcoat region comprises a part or portion (e.g. a front part or portion) of an upstream washcoat layer (e.g. the first washcoat layer as defined herein), the second washcoat region comprises a part or portion (e.g. a rear part or portion) of the upstream washcoat layer and a part or portion (e.g. a front part or portion) of a downstream washcoat layer (e.g. the third washcoat layer as defined herein), and the third washcoat region comprises a part or portion (e.g. a rear part or portion) of the downstream washcoat layer. This first oxidation catalyst aspect of the invention embraces two arrangements of the catalyst, which depend on the nature of the overlap in the second washcoat region. Such arrangements can be obtained by using a method in accordance with the second method aspect of the invention.

Generally, in the first oxidation catalyst aspect, the sum of the lengths of the first washcoat region, the second washcoat region and the third washcoat region is preferably the same as the length of the substrate.

The second washcoat region may have a length as defined above. Preferably the second washcoat region has a length of 10 to 40% of the length of the substrate, more preferably 15 to 35% of the length of the substrate, such as 20 to 30% of the length of the substrate.

The third washcoat region, in the first oxidation catalyst aspect, typically has a length of 10 to 40% of the length of the substrate, more preferably 15 to 35% of the length of the substrate, such as 20 to 30% of the length of the substrate.

In the first oxidation catalyst aspect, when the first washcoat region comprises, or consists of, a part or portion of an upstream washcoat layer (e.g. the first washcoat layer as defined herein), then the first washcoat region or the part or portion of the upstream washcoat layer may comprise a PGM zone. The PGM may be as defined above.

In a first arrangement, the second washcoat region may comprise, or consist of, a rear part or portion of the upstream washcoat layer disposed on (i.e. overlapping) a front part or portion of the downstream washcoat layer (see FIG. 3). The downstream washcoat layer (e.g. all or the whole of the downstream washcoat layer) is typically directly disposed on the substrate. It is preferred that a rear part or portion of the downstream washcoat layer does not support (e.g. is not covered by or does not underlie) the upstream washcoat layer. In the second method aspect, the first washcoat of length $L_1$ (see (7) in FIG. 3) forms part of the third washcoat region and the part of second washcoat region directly disposed on the substrate. The second washcoat of length $L_2$ (see (6) in FIG. 3) forms part of the first washcoat region and the part of the second washcoat region that is disposed on an underlying washcoat layer. The length of the first washcoat region is given by $L-L_1$, the length of the second washcoat region is given by $L_2+L_1-L$, and the length of the third washcoat region is given by $L-L_2$.

In the first arrangement, the first PGM (e.g. of the first washcoat region) is typically platinum (e.g. platinum only). The third PGM (e.g. of the third washcoat region) is preferably a combination of platinum and palladium. The second PGM (e.g. of the second washcoat region) is a combination of platinum and palladium. The second washcoat region comprises part of the first PGM from the first washcoat layer and part of the third PGM from the downstream washcoat layer (e.g. the third washcoat layer).

Alternatively, in a second arrangement, the second washcoat region may comprise, or consist of, a front part or portion of the downstream washcoat layer disposed on (i.e. overlapping) a rear part or portion of the upstream washcoat layer (see FIG. 4). The upstream washcoat layer (e.g. all or the whole of the upstream washcoat layer) is typically directly disposed on the substrate. It is preferred that a front part or portion of the upstream washcoat layer does not support (e.g. is not covered by or does not underlie) the downstream washcoat layer. In the second method aspect, the first washcoat of length $L_1$ (see (6) in FIG. 4) forms part of the first washcoat region and the part of second washcoat region directly disposed on the substrate. The second washcoat of length $L_2$ (see (7) in FIG. 4) forms part of the third washcoat region and the part of the second washcoat region that is disposed on an underlying washcoat layer. The length of the first washcoat region is given by $L-L_2$, the length of the second washcoat region is given by $L_2+L_1-L$, and the length of the third washcoat region is given by $L-L_1$.

In the second arrangement, the first PGM (e.g. of the first washcoat region) is typically a combination of platinum and palladium. The third PGM (e.g. of the third washcoat region) is preferably platinum (e.g. platinum only). The second PGM (e.g. of the second washcoat region) is a combination of platinum and palladium.

In the second arrangement, it is preferred that the first washcoat region or the upstream washcoat layer comprises a total mass of platinum that is greater than or equal to the total mass of palladium, such as described above.

The first aspect of the oxidation catalyst of the invention also relates to an oxidation catalyst where the first washcoat region comprises a first washcoat zone, the second washcoat region comprises a second washcoat zone, and the third washcoat region comprises a third washcoat zone. It is preferred that the first washcoat region consists of a first washcoat zone, the second washcoat region consists of a second washcoat zone and the third washcoat region consists of a third washcoat zone.

The second washcoat zone preferably has a length that is greater than or equal to the length of the first washcoat zone. More preferably, the second washcoat zone has a length that is greater than the length of the first washcoat zone. Even more preferably, the second washcoat zone has a length that is greater than the lengths of each of the first washcoat zone and the third washcoat zone.

The first washcoat zone typically consists of a first washcoat layer. It is preferred that there is no overlap between the first washcoat layer and the second washcoat layer. The first PGM of the first washcoat zone is as defined above.

The second washcoat zone may comprise, or consist of, a single washcoat layer, such as the second washcoat layer (as defined herein). The second washcoat zone may comprise, or consist of, two washcoat layers, such as the second washcoat layer (as defined herein) and a fourth washcoat layer, wherein the second washcoat layer is disposed on the fourth washcoat layer.

It is preferred that there is no overlap between the second washcoat layer and the third washcoat layer. When the second washcoat zone comprises a fourth washcoat layer, then it is preferred that there is no overlap between the fourth washcoat layer and the third washcoat layer.

In the first oxidation catalyst aspect, when the second washcoat region comprises, or consists of, a second washcoat zone, then preferably the second PGM is a combination of platinum and palladium. When the second washcoat zone comprises, or consists of, a second washcoat layer and a fourth washcoat layer, then preferably the second washcoat layer comprises platinum (e.g. platinum is the only PGM in the second washcoat layer) and the fourth washcoat layer comprises a combination of platinum and palladium (e.g. platinum and palladium are the only PGMs in the fourth washcoat layer).

The third washcoat zone may consist of a third washcoat layer.

In the first oxidation catalyst aspect, when the third washcoat region comprises, or consists of, a third washcoat zone or a third washcoat layer, then the third PGM is preferably platinum (e.g. platinum only).

An oxidation catalyst of the first aspect comprising a first washcoat zone, a second washcoat zone and a third washcoat zone can be made using a method of the first method aspect of the invention. The first washcoat zone or the third washcoat zone can be formed by impregnation step (iv) of the method.

The PGM zone or the first washcoat zone may be formed by an impregnation step in accordance with the method of the invention. When the PGM zone or the first washcoat zone is formed by the impregnation step, the PGM zone or the first washcoat zone has a length represented by $L_3$. If the first washcoat is impregnated, then preferably $L_3 < L_1$. The second washcoat zone then has a length represented by $L_1 - L_3$. The second washcoat zone is formed by the remaining, non-impregnated part of the first washcoat. If the second washcoat is impregnated, then preferably $L_3 < L_2$. The second washcoat zone then has a length represented by $L_2 - L_3$. The second washcoat zone is formed by the remaining, non-impregnated part of the second washcoat.

A second aspect of the oxidation catalyst of the invention relates to an arrangement where (ii) the second washcoat region is disposed or supported on the third washcoat region. Typically, the third washcoat region is adjacent to the first washcoat region. The third washcoat region is adjacent to the first washcoat region on the substrate (e.g. the third washcoat region is disposed next to the first washcoat region along the length of the substrate). It is preferred that both the second washcoat region and the third washcoat region are adjacent to the first washcoat region. Thus, both the second washcoat region and the third washcoat region are disposed next to the first washcoat region along the length of the substrate.

The second washcoat region and/or the third washcoat region is/are typically disposed at or adjacent to an outlet end of the substrate.

In the second oxidation catalyst aspect of the invention, the first washcoat region comprises, or consists of, a first washcoat layer or a first washcoat zone, the second washcoat region comprises a second washcoat layer, and the third washcoat region comprises a third washcoat layer. It is preferred that the first washcoat region consists of a first washcoat layer or a first washcoat zone, the second washcoat region consists of a second washcoat layer and the third washcoat region consists of a third washcoat layer. More preferably, the first washcoat region consists of a first washcoat layer.

When the first washcoat region comprises, or consists of, a first washcoat zone, then the first washcoat zone may be a PGM zone as defined above.

It is preferred that there is no overlap between the first washcoat layer and (a) the second washcoat layer and/or (b) the third washcoat layer.

Typically, in the second oxidation catalyst aspect of the invention, the second PGM is platinum (e.g. platinum only) and the third PGM is selected from the group consisting of palladium (e.g. palladium only) and a combination of platinum and palladium (e.g. platinum and palladium only). It is preferred that the third PGM is a combination of platinum and palladium. The first PGM is as defined above.

When the third PGM is a combination of platinum and palladium, the third washcoat layer comprises a ratio of the total mass of platinum to the total mass of palladium of 10:1 to 1:10 (e.g. 7.5:1 to 1:7.5), preferably 5:1 to 1:5 (e.g. 3:1 to 1:3), and more preferably 2.5:1 to 1:2.5 (e.g. 2:1 to 1:2), such as about 7:6 to 6:7.

In the second oxidation catalyst aspect, the length of the third washcoat layer may be equal to, greater than or less than the length of the second washcoat layer. It is preferred that the length of the third washcoat layer is about the same as the length of the second washcoat layer.

Generally, in the second oxidation catalyst aspect, the length of the second washcoat layer is from 20 to 90% of the length of the substrate, more preferably 30 to 80% of the length of the substrate, such as 40 to 70% of the length of the substrate, and even more preferably 40 to 60% of the length of the substrate.

It is preferred in the second oxidation catalyst aspect of the invention that the second washcoat layer has a length of greater than or equal to 50% of the length of the substrate. The second washcoat layer preferably has a length of 50 to 95% of the length of the substrate, more preferably 60 to 92.5% of the length of the substrate, such as 70 to 90% of the length of the substrate, and even more preferably 75 to 85% of the length of the substrate.

When the second washcoat layer has a length greater than or equal to 50% of the length of the substrate in the second oxidation catalyst aspect of the invention, then preferably the first washcoat region, the first washcoat zone or the first washcoat layer has a length of 5 to 50% of the length of the substrate, more preferably 7.5 to 40% of the length of the substrate, particularly 10 to 30% of the length of the substrate, and even more preferably 15 to 25% of the length of the substrate.

The second washcoat layer may overlap an end of the third washcoat layer such that a part or portion of the second washcoat layer is in direct contact with the substrate. Alternatively, the second washcoat layer may be disposed entirely on the third washcoat layer.

The third washcoat layer preferably has a length of greater than or equal to 50% of the length of the substrate. The third washcoat layer preferably has a length of 50 to 95% of the length of the substrate, more preferably 60 to 92.5% of the length of the substrate, such as 70 to 90% of the length of the substrate, and even more preferably 75 to 85 of the length of the substrate.

In the second oxidation catalyst aspect, the total loading of the second PGM is generally greater than the total loading of the third PGM. However, when the first washcoat zone comprises, or consists of, a first washcoat layer and a fourth washcoat layer, then alternatively the total loading of the third PGM may be greater than or equal to, preferably greater than, the total loading of the second PGM. It is preferred that the total loading of the second PGM is greater than the total loading of the third PGM, even when the first washcoat zone comprises, or consists of, a first washcoat layer and a fourth washcoat layer.

When the first washcoat region comprises, or consists of, a first washcoat zone, then the first washcoat zone may comprise, or consist of, a first washcoat layer and a fourth washcoat layer, wherein the fourth washcoat layer is disposed on the first washcoat layer, such as described above. The first washcoat layer and the fourth washcoat layer typically have about the same length. Such an oxidation catalyst may be prepared according to the second method aspect of the invention.

In the second oxidation catalyst aspect, when the first washcoat zone comprises, or consists of, a first washcoat layer and a fourth washcoat layer, then typically the total loading of the first PGM (e.g. of the first washcoat zone) is greater than the total loading of each of the second PGM (e.g. of the second washcoat layer) and the third PGM (e.g. of the third washcoat layer).

Each refractory metal (e.g. of the first, second or third support materials) oxide may be doped. The inclusion of a dopant can thermally stabilise the first support material. It is to be understood that any reference to "doped" in this context refers to a material where the bulk or host lattice of the refractory metal oxide is substitution doped or interstitially doped with a dopant.

When the refractory metal oxide is doped, then the total amount of dopant is 0.1 to 5 by weight (i.e. % by weight of the refractory metal oxide). It is preferred that the total amount of dopant is 0.25 to 2.5% by weight, more preferably 0.5 to 1.5% by weight (e.g. about 1% by weight). The refractory metal oxide may be doped with one or more dopant selected from the group consisting of zirconium (Zr), titanium (Ti), silicon (Si), yttrium (Y), lanthanum (La), cerium (Ce), praseodymium (Pr), samarium (Sm), neodymium (Nd) and an oxide thereof.

When the hydrocarbon adsorbent is a zeolite, then preferably each zeolite is a medium pore zeolite (e.g. a zeolite having a maximum ring size of eight tetrahedral atoms) or a large pore zeolite (e.g. a zeolite having a maximum ring size of ten tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. Each zeolite is preferably ZSM-5, a beta zeolite or a Y zeolite.

Typically, the first washcoat region, first washcoat zone or first washcoat layer does not comprise rhodium.

It may be preferable that the second washcoat region, the second washcoat zone or the second washcoat layer does not comprise rhodium.

The third washcoat region, the third washcoat zone or the third washcoat layer may not comprise rhodium.

In general, the oxidation catalyst of the invention may or may not comprise rhodium. It is preferred that the oxidation catalyst does not comprise ruthenium, rhodium, and iridium.

The oxidation catalyst of the invention is, in general, not a three-way catalyst (i.e. it does not have three-way catalyst activity). In particular, the oxidation catalyst of the invention does not typically perform substantial reduction of $NO_x$ to $N_2$ and $O_2$.

A further general feature of the oxidation catalyst of the invention is that when an alkali metal, particularly sodium or potassium, and especially potassium, is present, then preferably only the hydrocarbon adsorbent comprises the alkali metal, especially when the hydrocarbon adsorbent is a zeolite. It is further preferred that the oxidation catalyst of the invention does not comprise an alkali metal, particularly sodium or potassium.

The oxidation catalyst of the invention may or may not comprise an alkaline earth metal component (as defined above) and/or alumina doped with a heteroatom component (e.g. a heteroatom component as defined above).

Substrates for supporting oxidation catalysts for treating the exhaust gas of a diesel are well known in the art. The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

The substrate may have a diameter of from 2.5 to 15 inches, such as 4 to 15 inches, preferably 5 to 12.5 inches, such as 6 to 10 inches.

The length of the substrate is typically 2.5 to 15 inches, such as 3 to 12.5 inches, preferably 4 to 11 inches (e.g. 5 to 10 inches).

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) or is for use as a diesel oxidation catalyst (DOC).

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

In general, the oxidation catalyst of the invention is for use as a diesel oxidation catalyst (DOC).

The invention also provides an exhaust system comprising the oxidation catalyst and an emissions control device. In general, the emissions control device is separate to the oxidation catalyst (e.g. the emissions control device has a separate substrate to the substrate of the oxidation catalyst), and preferably the oxidation catalyst is upstream of the emissions control device.

The emissions control device may be selected from a diesel particulate filter (DPF), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and selective catalytic reduction filter (SCRF™) catalysts are all well known in the art.

An emissions control device having a filtering substrate may be selected from the group consisting of a diesel particulate filter (DPF), a catalysed soot filter (CSF) and a selective catalytic reduction filter (SCRF™) catalyst.

In a first exhaust system embodiment, the exhaust system comprises the oxidation catalyst of the invention (e.g. as a DOC) and either a diesel particulate filter (DPF) or a catalysed soot filter (CSF). This embodiment also relates to the use of the oxidation catalyst for treating an exhaust gas from a diesel engine in combination with a diesel particulate filter or a catalysed soot filter. The oxidation catalyst is typically followed by (e.g. is upstream of) the diesel particulate filter (DPF) or the catalysed soot filter (CSF). Thus, for example, an outlet of the oxidation catalyst is connected to an inlet of the diesel particulate filter or the catalysed soot filter.

In a second exhaust system embodiment, the exhaust system comprises the oxidation catalyst of the invention (e.g. as a DOC or a NAC, preferably a DOC) and a selective catalytic reduction (SCR) catalyst. This embodiment also relates to the use of the oxidation catalyst for treating an exhaust gas from a diesel engine in combination with a selective catalytic reduction filter (SCRF™) catalyst. The oxidation catalyst of the invention is typically followed by (e.g. is upstream of) the selective catalytic reduction (SCR) catalyst.

A third exhaust system embodiment comprises the oxidation catalyst of the invention (e.g. as a DOC) and a selective catalytic reduction filter (SCRF™) catalyst. This embodiment also relates to the use of the oxidation catalyst for treating an exhaust gas from a diesel engine in combination with a selective catalytic reduction filter (SCRF™) catalyst. The oxidation catalyst of the invention is typically followed by (e.g. is upstream of) the selective catalytic reduction filter (SCRF™) catalyst A fourth exhaust system embodiment relates to an exhaust system comprising the oxidation catalyst of the invention (e.g. as a DOC), a diesel particulate filter or a catalysed soot filter (CSF), and a selective catalytic reduction (SCR) catalyst. The DOC/DPF/SCR or DOC/CSF/SCR arrangement is a preferred exhaust system for a light-duty diesel vehicle. This embodiment also relates to the use of the oxidation catalyst for treating an exhaust gas from a diesel engine in combination with either a diesel particulate filter or a catalysed soot filter (CSF), and a selective catalytic reduction (SCR) catalyst. The oxidation catalyst is typically followed by (e.g. is upstream of) the diesel particulate filter or the catalysed soot filter (CSF). The DPF or CSF is typically followed by (e.g. is upstream of) the selective catalytic reduction (SCR) catalyst.

In a fifth exhaust system embodiment, the exhaust system comprises the oxidation catalyst of the invention (e.g. as a DOC), a selective catalytic reduction (SCR) catalyst and either a catalysed soot filter (CSF) or a diesel particulate filter (DPF). This embodiment also relates to the use of the oxidation catalyst for treating an exhaust gas from a diesel engine in combination with a selective catalytic reduction (SCR) catalyst and either a catalysed soot filter (CSF) or a diesel particulate filter (DPF). The oxidation catalyst of the invention is typically followed by (e.g. is upstream of) the selective catalytic reduction (SCR) catalyst. The selective catalytic reduction (SCR) catalyst is typically followed by (e.g. are upstream of) the catalysed soot filter (CSF) or the diesel particulate filter (DPF).

When the exhaust system comprises a DPF or a CSF, then the exhaust system may comprise a means for heating the DPF or the CSF to a regeneration temperature. Additional heat may be required for active regeneration of the DPF or CSF. The means for heating the DPF or the CSF to a regeneration temperature may be selected from resistive heating coils, an injector for injecting combustible HC into the exhaust gas downstream of the diesel engine and means for adjusting engine operation to generate additional HC in the exhaust gas. It is preferred that the means for heating the DPF or the CSF to a regeneration temperature is a means for adjusting engine operation to generate additional HC in the exhaust gas.

The DPF or CSF may further comprise resistive heating coils. When the exhaust system comprises an injector for injecting combustible HC into the exhaust gas, then the injector is downstream of the diesel engine and upstream the DPF or CSF and optionally upstream of the oxidation catalyst.

A nitrogenous reductant injector may be directly upstream of the selective catalytic reduction (SCR) catalyst or the selective catalyst reduction filter (SCRF™) catalyst. Thus, in the second, third and fifth exhaust system embodiments, the oxidation catalyst may be followed by (e.g. is upstream of) the nitrogenous reductant injector, and the nitrogenous reductant injector may be followed by (e.g. is upstream of) the SCR catalyst or the SCRF™ catalyst. In the fourth exhaust system embodiment, the DPF or CSF may be followed by (e.g. is upstream of) a nitrogenous reductant injector, and the nitrogenous reductant injector may be followed by (e.g. is upstream of) the selective catalytic reduction (SCR) catalyst.

The exhaust system may further comprise an $NO_2$ sensor and/or a temperature sensor.

When the exhaust system comprises an SCR catalyst or an SCRF™ catalyst, then it is preferred that the SCR catalyst or the SCRF™ catalyst comprises a copper exchanged zeolite or an iron exchanged zeolite. It is preferred that the SCR catalyst or the SCRF™ catalyst comprises a copper exchanged zeolite, such as a copper exchanged zeolite where the zeolite has a chabazite (CHA) structure.

The invention further provides a vehicle comprising a diesel engine and either an exhaust system of the invention or an oxidation catalyst of the invention. Typically, the oxidation catalyst is located downstream of the diesel engine, such as downstream of a turbo of the diesel engine.

The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

Methods for preparing the oxidation catalyst of the invention are known in the art. See, for example, our WO 99/47260, WO 2007/077462 and WO 2011/080525. Similarly, the conditions for drying and calcining a washcoat are also well known.

The first method aspect of producing an oxidation catalyst comprises the steps of: (i) coating a substrate with a first washcoat of length $L_1$, wherein the substrate has an axial length L and $L_1$ is less than or equal to the axial length L (e.g. $L_1 \leq L$); then (ii) coating the substrate with a second washcoat of length $L_2$, wherein $L_2$ is less than or equal to the axial length L (e.g. $L_2 \leq L$); (iii) drying the first washcoat and the second washcoat coated onto the substrate; (iv) impregnating at least one of the first washcoat and the second washcoat with a platinum group metal to a length $L_3$, wherein $L_3$ is less than the axial length L (e.g. $L_3<L$); and (v) calcining the substrate coated with the first washcoat, the second washcoat and with the impregnated platinum group metal. Methods for impregnating a washcoat or layer with a PGM are known in the art (see, for example, WO 2013/088152). The step of impregnating with a PGM can be used to form a zone, such as a first washcoat zone or a PGM zone as defined above.

Typically, the length $L_3$ is either less than the length $L_1$ or is less than the length $L_2$. It is preferred that the length $L_3$ is less than the length $L_1$ and the length $L_3$ is less than the length $L_2$.

In general, the first washcoat region or the third washcoat region of the oxidation catalyst is provided by step (iv) of impregnating at least one of the first washcoat and the second washcoat with a platinum group metal to a length $L_3$. It is preferred that the first washcoat region of the oxidation catalyst is provided by step (iv).

Step (iv) may comprise (iv) impregnating at least one of the first washcoat and the second washcoat with a platinum group metal to a length $L_3$ from a first end or a second end of the substrate.

Step (i) of the method typically comprises (i) coating a substrate from a first end with a first washcoat of length $L_1$.

Step (ii) may comprise (ii) coating a substrate from the first end with a second washcoat of length $L_2$. Thus, the substrate is coated with the first washcoat and the second washcoat from the same end.

It is preferred that at least one of the length $L_1$ of the first washcoat or the length $L_2$ of the second washcoat is equal to the axial length L of substrate (e.g. $L_1=L$ or $L_2=L$). More preferably, the length $L_1$ of the first washcoat is equal to the axial length L of substrate.

The length $L_2$ of the second washcoat may be less than or equal to the length $L_1$ of the first washcoat (e.g. $L_2 \leq L_1$). It is preferred that the length $L_2$ of the second washcoat is equal to the axial length L of the substrate (e.g. $L_2=L$).

When the substrate is coated with the first washcoat and the second washcoat from the same end (e.g. the first end), then preferably step (iii) comprises (iii) impregnating both the first washcoat and the second washcoat with a platinum group metal to a length $L_3$ from the first end of the substrate.

Alternatively, step (ii) may comprise, or consist of, (ii) coating a substrate from a second end of the substrate with a second washcoat of length $L_2$. It is preferred that $L_2$ is greater than the difference between L and $L_1$ (e.g. $L_2>L-L_1$).

The second method aspect of the method of producing an oxidation catalyst of the invention is particularly advantageous because it is cost effective. In particular, the method allows the preparation of an oxidation catalyst of the invention using a single calcination pass.

In general, the method for preparing an oxidation catalyst of the invention comprises a single step of calcining the substrate coated with the first washcoat, the second washcoat and optionally the impregnated platinum group metal.

The second method aspect of producing the oxidation catalyst comprises, or consists of, the steps: (i) coating a substrate from a first end with a first washcoat of length $L_1$, wherein the substrate has an axial length L and $L_1$ is less than the axial length L (e.g. $L_1<L$); then (ii) coating the substrate from a second end with a second washcoat of length $L_2$, wherein $L_2$ is greater than the difference between L and $L_1$ (e.g. $L_2>L-L_1$); and (iii) calcining the substrate coated with the first washcoat and the second washcoat. The length $L_2$ is less than or equal to the length of the substrate L (e.g. $L_2 \leq L$), preferably length $L_2$ is less than or equal to the length of the substrate (e.g. $L_2<L$).

This method aspect of the invention can be used to produce an oxidation catalyst of the invention according to the first oxidation catalyst aspect where the second washcoat region is formed by the overlap between an upstream washcoat layer and a downstream washcoat layer (e.g. a third washcoat layer). Since the sum of the lengths of the first and second washcoats is greater than the axial length of the substrate (i.e. $|L_2+L_1|>L$), the second washcoat overlaps the first washcoat on the substrate to form the second washcoat region. The length of the second washcoat region $L_M$ may be represented by $L_M=L_2+L_1-L$.

In this method aspect of the invention, the step of coating a substrate from a first end with a first washcoat provides either (a) the downstream washcoat layer (e.g. the third washcoat layer) in the first arrangement of the first oxidation catalyst arrangement or (b) the first washcoat layer in the second arrangement of the first oxidation catalyst arrangement.

The invention also provides a method of modulating the content of nitrogen oxides ($NO_x$) in an exhaust gas from a diesel engine for an emissions control device. Any reference to "modulate the $NO_x$ content" as used herein, particularly in relation to method or use aspects of the invention, refers to changing (i.e. adjusting) or maintaining the ratio (in ppm or % volume, typically at the temperature and pressure of the exhaust gas) of $NO:NO_2$ to be within a predefined range.

In general, "modulate the $NO_x$ content" refers to changing or maintaining, preferably changing, the ratio (in ppm or % volume) of $NO:NO_2$ in an exhaust gas, typically directly from the diesel engine, to be less than 17:3 (i.e. the amount of NO to $NO_2$ is less than that which is normally found in an exhaust gas from a diesel engine), preferably the ratio of $NO:NO_2$ is from 5:1 to 1:5, more preferably 2.5:1 to 1:2.5, and even more preferably 2:1 to 1:2 (e.g. 1.5:1 to 1:1.5 or about 1:1).

Definitions

The acronym "PGM" as used herein refers to "platinum group metal". The term "platinum group metal" generally refers to the metals Ru, Rh, Pd, Os, Ir and Pt of the Periodic Table, particularly the metals Ru, Rh, Pd, Ir and Pt.

The term "washcoat" is known in the art and refers to an adherent coating that is applied to a substrate during production of a catalyst. The coating or washcoat generally comprises one or more components of a catalyst formulation.

The term "washcoat region" used herein refers to an area or portion of one or more washcoats on a substrate. A washcoat region has a distinct, overall composition that is different to an adjacent or neighbouring washcoat region. The term "washcoat region" embraces the terms "washcoat layer" and "washcoat zone". A washcoat region may comprise, or consist of, a single washcoat layer. The washcoat region may comprise, or consist of, two washcoat layers. The washcoat region may comprise all or part of each washcoat layer. For example, a washcoat region could be the area or region of washcoats on a substrate where an end of a first washcoat layer overlaps with an end of a second washcoat layer (e.g. see (2) in FIGS. 3 and 4). A washcoat region may comprise, or consist of, a single washcoat zone.

The term "washcoat zone" used herein refers to the horizontal arrangement of either one or more washcoats along the length of a substrate or an impregnated part or portion of one or more washcoats along the length of a substrate. A "washcoat zone" has a distinct upstream and downstream boundary or edge (i.e. it is possible to distinguish one washcoat zone from another washcoat zone or layer using conventional analytical techniques).

When the "washcoat zone" refers to the arrangement of one or more washcoats along the length of a substrate, then typically there is no overlapping of washcoat layers within the washcoat zone. Thus, the washcoat zone typically comprises a discrete washcoat layer. For example, a washcoat zone may comprise, or consist of, two washcoat layers (e.g. two complete washcoat layers), such as where one layer is disposed on the other. The boundaries or edges of each washcoat layer are coterminous. In this context, the term "washcoat zone" is narrower than "washcoat region" because a "washcoat zone" does not comprise part of a washcoat layer.

When the "washcoat zone" refers to the arrangement of an impregnated part or portion of one or more washcoats along the length of a substrate, the washcoat zone may be a part or portion of a single washcoat layer. Alternatively, the washcoat zone may be a part or portion of a plurality of washcoat layers, such as two washcoat layers. One of the boundaries or edges of the washcoat zone will be at an end of the substrate (e.g. an inlet end or an outlet end of the substrate). When the washcoat zone is a part or portion of a plurality of washcoat layers, then the washcoat layers will have a common boundary or edge (i.e. along the length of the substrate).

The term "washcoat layer" used herein refers to a thickness of washcoat spread over a surface (e.g. a surface of the substrate or another washcoat), which has a substantially uniform composition (i.e. there is no substantial difference in the composition of the washcoat when comparing one part of the washcoat region with another part of that washcoat region). Substantially uniform composition in this context typically refers to a washcoat layer where the difference in composition when comparing one part of the layer with another part of the layer is 5% or less, usually 2.5% or less, and most commonly 1% or less. Thus, a washcoat layer is a discrete region or area of washcoat on the substrate.

Any reference to a washcoat region, zone or layer "disposed at an inlet end of the substrate" used herein refers to a washcoat region, zone or layer that is located on a substrate at a position that is nearer to an inlet end of the substrate than it is to an outlet end of the substrate. Thus, the midpoint of the washcoat region, zone or layer (i.e. at half its length) is nearer to the inlet end of the substrate than the midpoint is to the outlet end of the substrate. Any reference to "disposed at an outlet end of the substrate" used herein refers to a washcoat region, zone or layer that is located on a substrate at a position is nearer to an outlet end of the substrate than it is to an inlet end of the substrate. The midpoint of the washcoat region, zone or layer (i.e. at half its length) is nearer to the outlet end of the substrate than the midpoint is to the inlet end of the substrate.

The expression "combination of platinum and palladium" as used herein simply refers to a washcoat region, layer or zone that contains both platinum and palladium. The "combination" includes, but is not limited to, alloys or mixtures of platinum and palladium.

The term "mixed oxide" used herein generally refers to a mixture of oxides in a single phase, as known in the art. The term "composite oxide" used herein generally refers to a composition of oxides having more than one phase, as known in the art.

Any reference herein to an amount in units of g $ft^{-3}$ (grams per cubic foot) or g $in^{-3}$ (grams per cubic inch) etc. refer to the mean weight of a component per volume of the substrate.

The expression "consisting essentially" used herein limits the scope of a feature to include the specified materials or steps, and any other materials or steps that do not materially affect the basic characteristics of that feature, such as for example minor impurities. The expression "consisting essentially of" embraces the expression "consisting of".

Any reference to the length of a zone, layer or region used herein refers to its mean length. It is well known in the art that there may be some variation in the precise length of the zone, layer or region depending on the method used for its manufacture. Normally, the length does not deviate by more than 5%, preferably not more than 1%, from the mean value of the length. The length of a zone, layer or region is measured parallel to the longitudinal axis (i.e. axial length) of the oxidation catalyst.

Reference is made herein to the lengths $L_1$, $L_2$ and $L_3$. Each of these lengths is measured from the end of the substrate that was coated with the relevant washcoat (in the case of $L_1$ or $L_2$) or impregnated with a platinum group metal (in the case of $L_3$). Any reference to a first end of the substrate relates to a different end of the substrate to the second end of the substrate. Normally, the first end of the substrate is the opposite end of the substrate to the second end.

The expression "adsorber" or "adsorbent" as used herein is synonymous with "absorber" or "absorbent".

For the avoidance of doubt, the terms "length of the substrate" and "axial length of the substrate" are synonymous.

EXAMPLES

The invention will now be illustrated by the following non-limiting examples.
Preparation of Catalysts A zoned diesel oxidation catalyst (Zoned DOC) was prepared in accordance with the second method aspect of the invention and as described in WO 99/47260. The zoned (DOC) has a structure as shown in FIG. 4. The length of the first washcoat region (1) (e.g. $L-L_2$) was 25% of the length of the substrate (e.g. L). The loading of platinum was 26.7 g ft$^{-3}$ and the loading of palladium was 26.7 g ft$^{-3}$ in the first washcoat region. The length of the second washcoat region (2) (e.g. $L_2+L_1-L$) was 20% of the length of the substrate. The loading of platinum was 34.7 g ft$^{-3}$ and the loading of palladium was 26.7 g ft$^{-3}$ in the second washcoat region. The length of the third washcoat region (3) (e.g. $L-L_1$) was 55% of the length of the substrate. The loading of platinum was 8 g ft$^{-3}$ in the third washcoat region and no palladium was present. The overall loading of PGM (e.g. platinum and palladium) of the catalyst was 30 g ft$^{-3}$. The ratio of the total mass of platinum to the total mass of palladium in the oxidation catalyst was 1.5:1.

Figure 5:
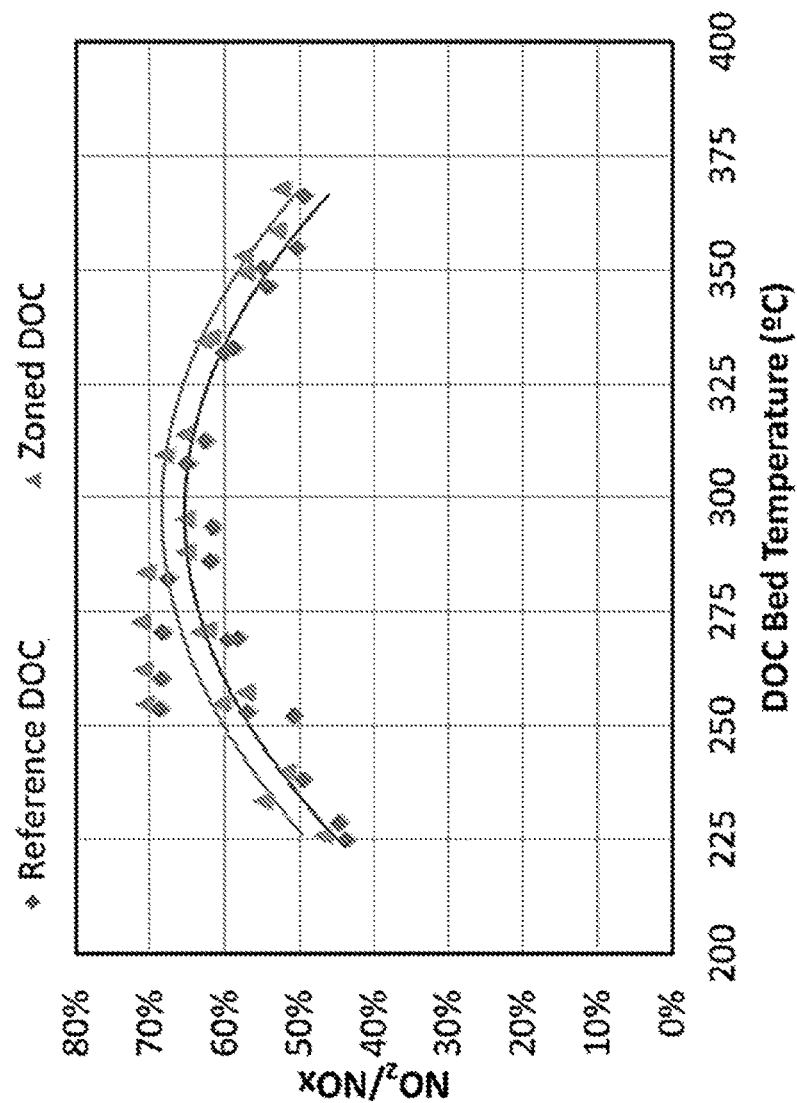
FIG. 5 is a graph showing % $NO_2$ content of $NO_x$ from oxidation of NO by the Reference DOC (♦) and Zoned DOC (▲) at various temperatures.
Figure 6:
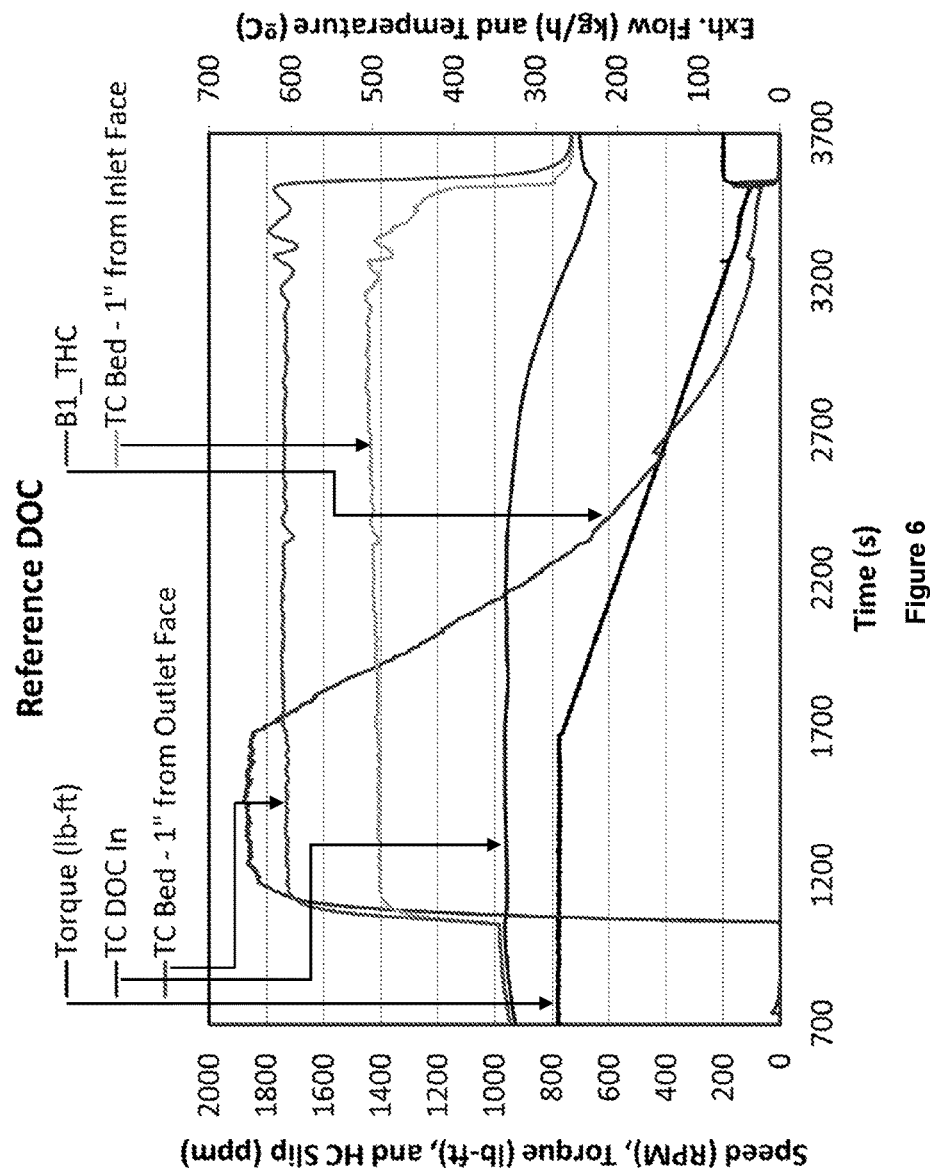
FIGS. 6 and 7 show the results of quench tests performed on the Reference DOC and Zoned DOC respectively.
Figure 7:
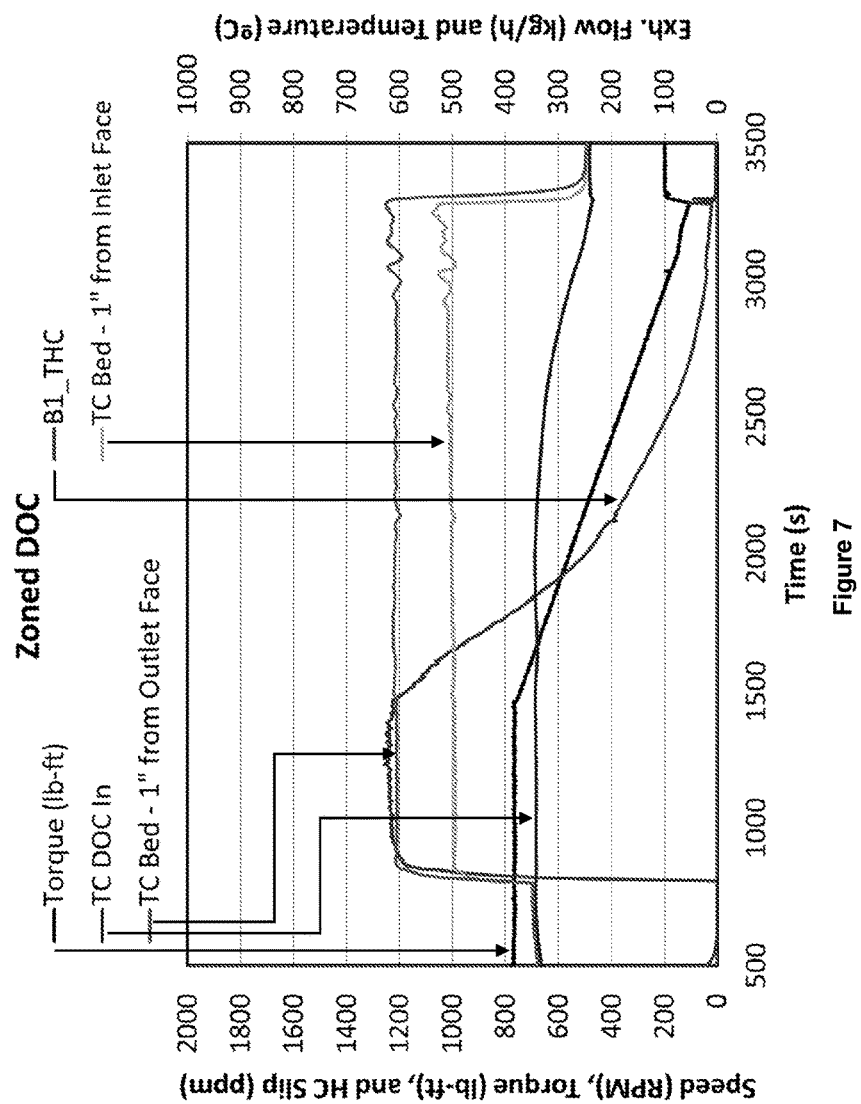
Figure 8:
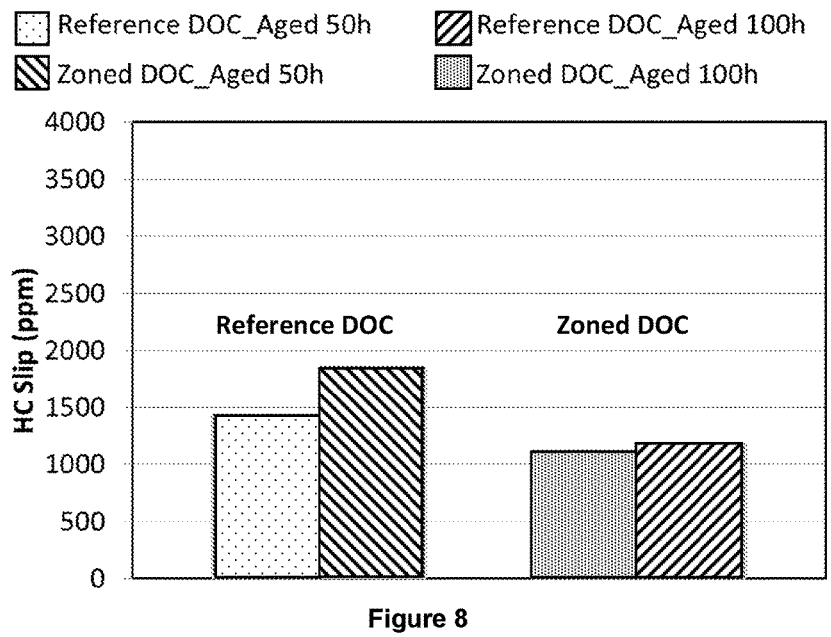
FIGS. 8 and 9 are histograms showing the amount of HC slip for the Reference DOC and Zoned DOC.
Figure 9:
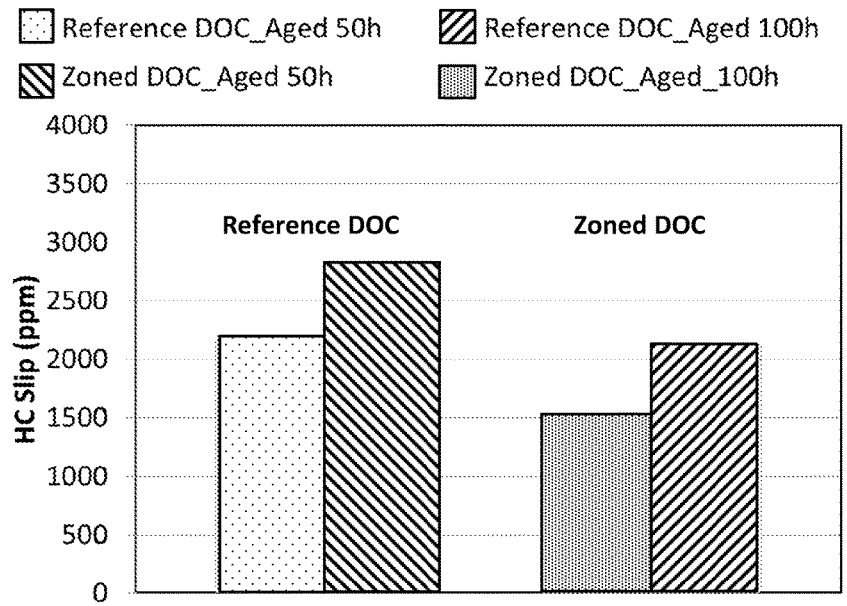
Figure 10:
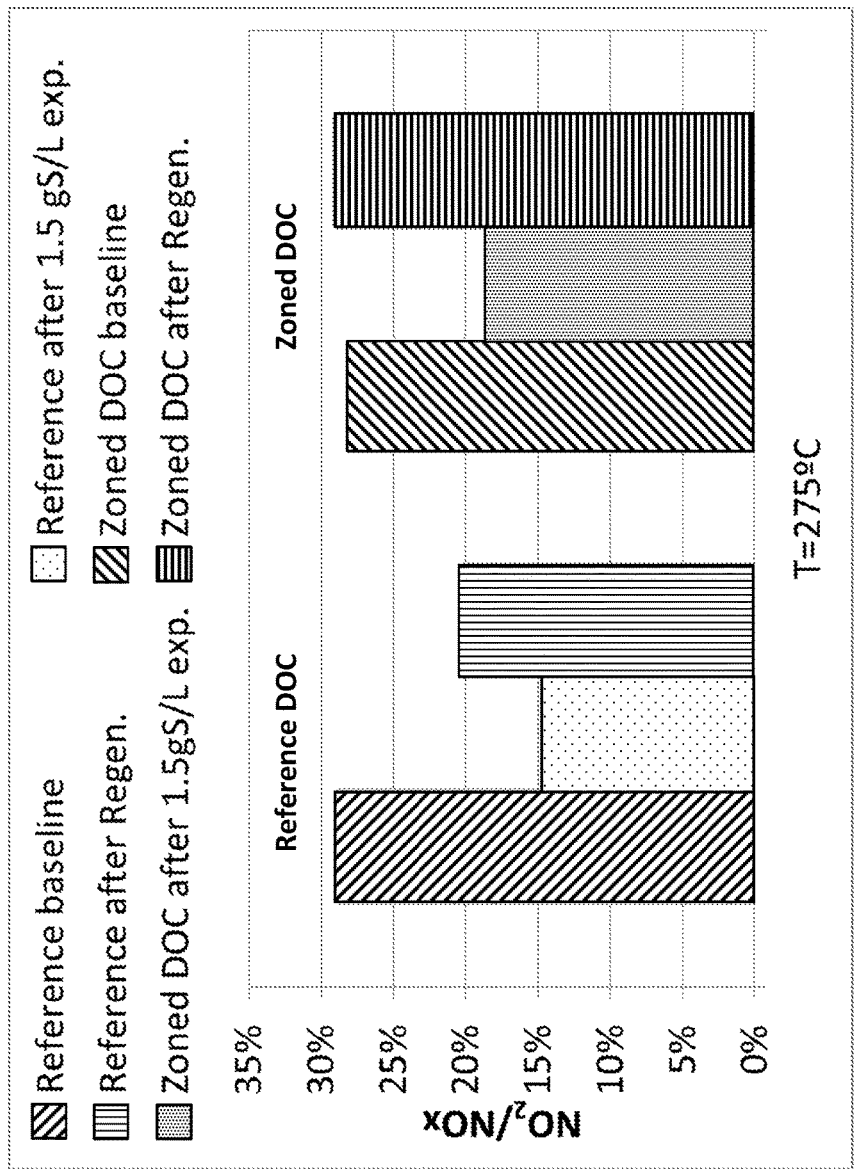
FIG. 10 is a histogram showing % $NO_2$ content of $NO_x$ from oxidation of NO after the Reference DOC and Zoned DOC have each been exposed to sulphur in diesel fuel.

A reference diesel oxidation catalyst (Reference DOC) was prepared using a method as described in WO 99/47260 for comparative purposes. The reference oxidation catalyst had two washcoat layers, which were each coated along the entire length of the substrate. A first layer that was coated directly onto the substrate contained a platinum loading of 16 g ft$^{-3}$ and a palladium loading of 16 g ft$^{-3}$. A second layer was coated onto the first layer and contained a platinum loading of 8 g ft$^{-3}$. The overall loading of PGM (e.g. platinum and palladium) of the catalyst was 40 g ft$^{-3}$. The ratio of the total mass of platinum to the total mass of palladium in the oxidation catalyst was 1.5:1.
NO Oxidation Activity The NO oxidation activity of the Zoned DOC and the Reference DOC were measured and the results are shown in FIG. 5. The Zoned DOC (▲) shows greater NO oxidation activity than the Reference DOC (♦) even though the Zoned DOC has a lower total PGM loading of 30 g ft$^{-3}$ than the Reference DOC, which has a total PGM loading of 40 g ft$^{-3}$.
Hydrocarbon Oxidation Activity The Zoned DOC and the Reference DOC were tested before and after ageing on a 7 L IT4 engine at 610° C. for 50 and 100 hours in a DOC+CSF filter configuration. The Zoned DOC and Reference DOC were compared in a quench test. Diesel fuel was injected over each catalyst to generate an exotherm, so that the exhaust gas temperature leaving the catalyst was 610° C. Exotherm generation was stabilized at steady state temperature and flow conditions (speed and load of the engine) and then the load of the engine was reduced so that the catalyst inlet temperature was reduced. When the catalyst inlet temperature becomes too low to sustain exotherm generation the catalyst quenches. The results are shown in FIGS. 6 and 7. As can be seen in FIG. 6, the Reference DOC quenches at 270° C. In contrast, the Zoned DOC does not quench under the same conditions (see FIG. 7), which indicates that it has superior HC oxidation activity compared to the Reference DOC. The Zoned DOC maintains its HC oxidation performance at lower temperatures than the Reference DOC. This indicates that the Zoned DOC can be used to regenerate emissions control devices comprising a filtering substrate at low operating temperatures. The HC slip from each catalyst was also tested under the same catalyst inlet temperature and flow conditions. The results shown in FIG. 8 were obtained with an exhaust flow of about 880 kg h$^{-1}$, a GHSV of 75 k h$^{-1}$, the catalyst inlet and outlet temperatures were 340 and 610° C. respectively. The results shown in FIG. 9 were obtained with an exhaust flow of about 1050 kg h$^{-1}$, a GHSV of 115 k h$^{-1}$, the catalyst inlet and outlet temperatures were 330 and 610° C. respectively. The Zoned DOC shows lower HC slip than the Reference DOC.
Sulphur Tolerance The Zoned DOC and the Reference DOC were each sulphated with low S diesel (1.5 g L$^{-1}$ of sulphur) and the NO oxidation performance was measured at 275° C. It can be seen from FIG. 10 that the Zoned DOC loses less NO oxidation performance after S exposure than the Reference DOC. The Zoned DOC also recovers fully after regeneration, while the Reference DOC recovers partially after regeneration at the same temperature. The HC slip during regeneration for each catalyst did not change after sulphation.

For the avoidance of any doubt, the entire content of any and all documents cited herein is incorporated by reference into the present application.

The invention claimed is:
1. An oxidation catalyst for treating an exhaust gas from a diesel engine, which oxidation catalyst comprises:
   a substrate;
   a first washcoat region disposed on the substrate, wherein the first washcoat region comprises a first platinum group metal (PGM) and a first support material;
   a second washcoat region adjacent to the first washcoat region, wherein the second washcoat region comprises a second platinum group metal (PGM) and a second support material;
   a third washcoat region disposed on the substrate, wherein the third washcoat region comprises a third platinum group metal (PGM) and a third support material; and
   wherein the second washcoat region is disposed on the third washcoat region, and further wherein:
   (a) the total loading of the second PGM in the second washcoat region is greater than the total loading of the first PGM in the first washcoat region; and/or

(b) the total loading of the second PGM in the second washcoat region is greater than the total loading of the third PGM in the third washcoat region; and/or (c) the total loading of the first PGM in the first washcoat region is greater than the total loading of the third PGM in the third washcoat region.

2. The oxidation catalyst according to claim 1, wherein the first washcoat region comprises a first washcoat layer or a first washcoat zone, the second washcoat region comprises a second washcoat layer, and the third washcoat region comprises a third washcoat layer.

3. The oxidation catalyst according to claim 1, wherein the first washcoat region consists of a first washcoat layer.

4. The oxidation catalyst according to claim 2, wherein the first washcoat zone comprises a first washcoat layer and a fourth washcoat layer, wherein the fourth washcoat layer is disposed on the first washcoat layer.

5. The oxidation catalyst according to claim 1, wherein the total loading of the second PGM in the second washcoat region is greater than the total loading of the third PGM in the third washcoat region.

6. The oxidation catalyst according to claim 1, wherein the total loading of the first PGM in the first washcoat region is greater than the total loading of the third PGM in the third washcoat region.

7. The oxidation catalyst according to claim 1, wherein the total loading of the second PGM in the second washcoat region is greater than the total loading of the first PGM in the first washcoat region.

8. The oxidation catalyst according to claim 1, wherein the first PGM is selected from the group consisting of platinum and a combination of platinum and palladium.

9. The oxidation catalyst according to claim 1, wherein the second PGM is selected from the group consisting of platinum and a combination of platinum and palladium.

10. The oxidation catalyst according to claim 1, wherein the third PGM is selected from the group consisting of platinum and a combination of platinum and palladium.

11. The oxidation catalyst according to claim 1, wherein the first support material comprises a refractory metal oxide selected from the group consisting of alumina, silica, titania, zirconia, ceria and mixed or composite oxides of two or more thereof.

12. The oxidation catalyst according to claim 1, wherein the second support material comprises a refractory metal oxide selected from the group consisting of alumina, silica, titania, zirconia, ceria and mixed or composite oxides of two or more thereof.

13. The oxidation catalyst according to claim 1, wherein the third support material comprises a refractory metal oxide selected from the group consisting of alumina, silica, titania, zirconia, ceria and mixed or composite oxides of two or more thereof.

14. An exhaust system comprising an oxidation catalyst according to claim 1, and an emissions control device.

15. A vehicle comprising a diesel engine and the exhaust system according to claim 14.

16. The oxidation catalyst according to claim 1, wherein the second washcoat region has a ratio by total weight of manganese (Mn) to platinum in a range of from of 5:1 to 0.2:1.

17. The oxidation catalyst according to claim 1, wherein the second washcoat region comprises palladium.

18. The oxidation catalyst according to claim 1, wherein the second washcoat region has a ratio of platinum to palladium by total weight of from 1:0 to 2:1.

19. The oxidation catalyst according to claim 1, wherein at least one of the first support material, the second support material, or the third support material comprises alumina doped with silica or silica-alumina.

20. The oxidation catalyst according to claim 1, wherein the first washcoat region further comprises at least one of an alkali metal, alkaline earth metal and a rare earth metal selected from the group consisting of lanthanum, yttrium and a combination thereof.

21. The oxidation catalyst according to claim 1, wherein the first PGM is disposed or supported on the first support material.

22. The oxidation catalyst according to claim 1, wherein the first support material comprises a refractory metal oxide comprising an alkaline earth metal aluminate.

23. The oxidation catalyst according to claim 1, wherein the first support material comprises a refractory metal oxide selected from the group consisting of alumina, silica, titania, zirconia, ceria and a mixed or composite oxide thereof, optionally doped with a dopant.

24. The oxidation catalyst according to claim 1, wherein the first PGM is a combination of platinum and palladium, and wherein at least one of the platinum and the palladium is disposed or supported on the first support material.

25. The oxidation catalyst according to claim 1, wherein the first PGM is a combination of platinum and palladium, a combination of palladium and rhodium or a combination of platinum, palladium and rhodium, and wherein the first washcoat region further comprises a palladium support material.

26. The oxidation catalyst according to claim 25, wherein at least one of the platinum and the rhodium is disposed or supported on the first support material and the palladium is disposed or supported on the palladium support material.

27. The oxidation catalyst according to claim 26, wherein the palladium support material comprises a refractory metal oxide comprising ceria or a mixed or composite oxide of ceria.

28. The oxidation catalyst according to claim 1, wherein the substrate is a through-flow substrate.

29. The oxidation catalyst according to claim 4, wherein the total loading of the first PGM is greater than the total loading of each of the second PGM and the third PGM.

* * * * *